(12) United States Patent
Sugihara

(10) Patent No.: US 9,747,846 B2
(45) Date of Patent: Aug. 29, 2017

(54) DISPLAY DEVICE

(71) Applicant: Sharp Kabushiki Kaisha, Osaka (JP)

(72) Inventor: Toshinori Sugihara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 60 days.

(21) Appl. No.: 14/901,704

(22) PCT Filed: Jun. 24, 2014

(86) PCT No.: PCT/JP2014/066631
§ 371 (c)(1),
(2) Date: Dec. 28, 2015

(87) PCT Pub. No.: WO2015/002016
PCT Pub. Date: Jan. 8, 2015

(65) Prior Publication Data
US 2016/0275881 A1 Sep. 22, 2016

(30) Foreign Application Priority Data

Jul. 1, 2013 (JP) ................................. 2013-137998

(51) Int. Cl.
*G09G 3/34* (2006.01)
*G02B 26/08* (2006.01)
(Continued)

(52) U.S. Cl.
CPC ........... *G09G 3/3433* (2013.01); *G02B 26/04* (2013.01); *G02B 26/08* (2013.01); *G02B 27/225* (2013.01); *G02B 27/2214* (2013.01); *G09G 3/3426* (2013.01); *H04N 13/0418* (2013.01); *G09G 2320/068* (2013.01); *H04N 2213/001* (2013.01)

(58) Field of Classification Search
CPC ............... G09G 3/3426; G09G 3/3433; G09G 2320/068; G02B 26/08; G02B 26/04; G02B 27/225; G02B 27/2214; H04N 13/0418; H04N 2213/001
See application file for complete search history.

(56) References Cited

U.S. PATENT DOCUMENTS

2006/0187190 A1    8/2006   Hagood et al.
2006/0187191 A1    8/2006   Hagood et al.
(Continued)

FOREIGN PATENT DOCUMENTS

JP    2008-524649 A    7/2008
JP    2008-532068 A    8/2008
(Continued)

*Primary Examiner* — Vijay Shankar
*Assistant Examiner* — Abhishek Sarma
(74) *Attorney, Agent, or Firm* — Chen Yoshimura LLP

(57) ABSTRACT

In order to achieve a display device that can display a plurality of images and also prevents a lowering of resolution of the images displayed by emitting light in a plurality of different direction from one pixel, a display device, which is a display device that can display at least two images by emitting light in at least two directions from each of a plurality of pixels, includes: a backlight unit, a backlight side substrate, a display side substrate, a MEMS shutter, and a display control unit. The display device can display an image for a first viewpoint and an image for a second viewpoint by the display control unit controlling the MEMS shutter for each of the pixels.

14 Claims, 17 Drawing Sheets

(51) Int. Cl.
*H04N 13/04* (2006.01)
*G02B 26/04* (2006.01)
*G02B 27/22* (2006.01)

(56) References Cited

U.S. PATENT DOCUMENTS

| | | |
|---|---|---|
| 2006/0187528 A1 | 8/2006 | Hagood et al. |
| 2006/0187529 A1 | 8/2006 | Hagood et al. |
| 2006/0187530 A1 | 8/2006 | Hagood et al. |
| 2006/0187531 A1 | 8/2006 | Hagood et al. |
| 2006/0250325 A1 | 11/2006 | Hagood et al. |
| 2006/0256039 A1 | 11/2006 | Hagood et al. |
| 2007/0285509 A1 | 12/2007 | Lee |

FOREIGN PATENT DOCUMENTS

| | | |
|---|---|---|
| JP | 2008-533510 A | 8/2008 |
| JP | 2014-92744 A | 5/2014 |
| WO | 2006/068426 A1 | 6/2006 |
| WO | 2006/091791 A2 | 8/2006 |
| WO | 2006/091860 A2 | 8/2006 |
| WO | 2014/074514 A1 | 5/2014 |

DISPLAY DEVICE

TECHNICAL FIELD

The present invention relates to a display device capable of multiple view (dual view, for example), glass-free 3D display (autostereoscopic display), or the like.

BACKGROUND ART

Conventionally, there has been a display device that displays a plurality of images (video images) and that allows the viewer to observe a plurality of different images (video images) depending on the angle from which the viewer views the display screen. Such a display device can be used to enable multiple view (dual view, for example) or glass-free 3D display (autostereoscopic display).

Patent Document 1 (Japanese Patent Application Publication No. 2008-524649, which is a Japanese Translation of PCT International Publication No. WO 2006/068426) discloses a stereoscopic image display device capable of glass-free 3D display, for example.

The stereoscopic image display device disclosed in Patent Document 1 uses the parallax barrier method. This stereoscopic image display device is equipped with a light source module including a red (R) light source, a green (G) light source, and a blue (B) light source, and a light diffusion plate that diffuses the light generated by the light source module. The stereoscopic image display device according to Patent Document 1 includes: a light-emitting module, in which the light sources of each color in the light source module generate the respective colors of light for a unit time and display the respective colors of light sequentially on the entire light-exiting surface of the light diffusion plate; a display panel, in which a pixel for the left eye and a pixel for the right eye are alternately arranged in pixel units and a video signal adjusts, for each of the pixel units, the transmission amount of each color of light that is displayed sequentially by the light-emitting module to display an image for the left eye and an image for the right eye that are arranged alternately; and a barrier arranged at a prescribed distance away from the display panel, which enables the image for the left eye and the image for the right eye to be seen in a selective manner.

Using this configuration, the stereoscopic image display device according to Patent Document 1 achieves a high-resolution video image even in a small screen by using a video signal to sequentially display R, G, and B in each of the pixels and by displaying a stereoscopic image on the pixel units.

SUMMARY OF THE INVENTION

Problems to be Solved by the Invention

In the conventional technology described above, however, the resolution of the display device is reduced by half (a half of the number of pixels).

In other words, the stereoscopic image display device described above displays an image only for the right and an image only for the left eye on the pixel units by using a video signal to sequentially emit light from the R light source, the G light source, and the B light source. By shielding light using a parallax barrier to make each of the left and right video images visible, the stereoscopic image display device displays a stereoscopic image. Namely, the stereoscopic image display device described above requires pixels dedicated to generating an image for the left eye and the pixels dedicated to generating an image for the right eye. As a result, the resolution of the display device in the stereoscopic image display device described above is reduced by half (a half of the number of pixels).

In view of problems described above, the present invention aims to achieve a display device that can display a plurality of video images and prevent the reduction in the resolution of the displayed video images by emitting light from one pixel unit toward a plurality of different directions.

Means for Solving the Problems

To solve problems described above, a display device according to a first configuration is a display device that displays at least first and second images by emitting light in at least two directions, respectively, from each of a plurality of pixels and includes a light source, a first substrate, and a second substrate.

The first substrate is a substrate over the light source restricting light from the light source.

At each of the pixels, the first substrate has one or more of first apertures.

The second substrate is a substrate over the first substrate.

At each of the pixels, the second substrate has one or more of second apertures, and at each of the pixels, the one or more of the first apertures and the one or more of the second apertures are configured to define at least a first optical path and a second optical path that are different from each other for the light from the light source.

Each of the pixels has an electrically conductive light-shielding member movably disposed between the first substrate and the second substrate and driving electrodes that cause the light-shielding member to move to prescribed positions.

Each of the pixels has driving electrodes that cause the light-shielding member to the respective prescribed positions.

In order to display the first image, at each of the pixels, the driving control unit causes the light-shielding member to move between a first position where the first optical path is not blocked and the second optical path is blocked by the light-shielding member and a second position where the first and second optical paths are both blocked by the light-shielding member, and in order to display the second image, at each of the pixels, the driving control unit causes the light-shielding member to move between a third position where the first optical path is blocked and the second optical path is not blocked by the light-shielding member and a fourth position where the first and second optical paths are both blocked by the light-shielding member.

Effects of the Invention

The present invention can achieve a display device that can display a plurality of video images and prevent the reduction in the resolution of the displayed video images by emitting light from one pixel unit toward a plurality of different directions.

DETAILED DESCRIPTION OF EMBODIMENTS

Embodiment 1

Embodiment 1 is described below with reference to the drawings.

<1.1 Configuration of Display Device>

Figure 1:
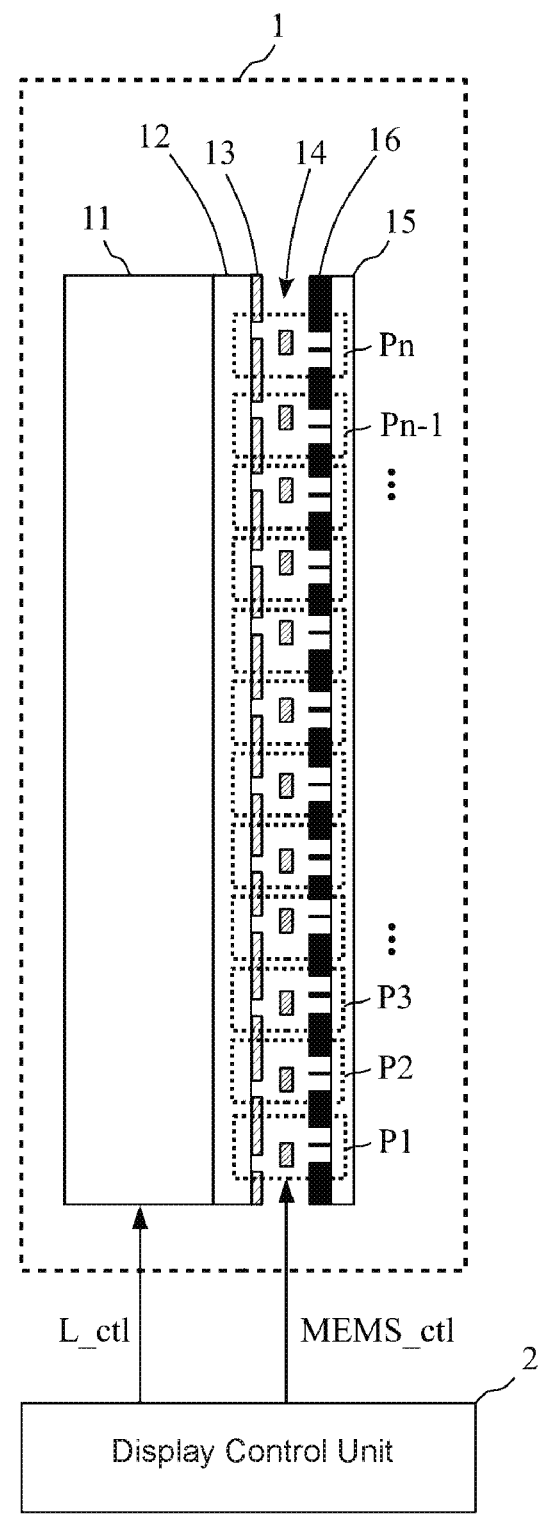
FIG. 1 is a schematic configuration diagram of a display device 1000 according to Embodiment 1.

FIG. 1 is a schematic configuration diagram of a display device 1000 according to Embodiment 1.

FIG. 1 is used to describe the display device 1000 but is not a diagram showing accurate size, shape, or the like.

As shown in FIG. 1, the display device 1000 includes a display unit 1 and a display control unit 2. The display device 1000 is a device that can display a plurality of video images by emitting light in a plurality of different directions from one pixel unit. Below, a display device that displays two video images (images) by emitting light in two different directions from each of the pixels of the display device 1000 is used as one example for description. Also, the situation in which a MEMS (micro-electro-mechanical-systems) shutter is used is described below. The MEMS shutter is a shutter (an element (structure) that controls the passing and blocking of light) enabled by the MEMS technology as disclosed in Japanese Patent Application Publication No. 2008-533510, which is a Japanese Translation of PCT International Publication No. WO 2006/091860, or Japanese Patent Application Publication No. 2008-532068, which is a Japanese Translation of PCT International Publication No. WO 2006/091791, for example.

As shown in FIG. 1, the display unit 1 includes a backlight unit 11, which includes light sources and emits light toward the display surface, a backlight side substrate 12, which is arranged as to cover the surface of the backlight unit 11 that emits light (backlight surface), and a backlight side light-shielding film 13, which is formed on the backlight side substrate 12.

In addition, as shown in FIG. 1, the display unit 1 includes a MEMS shutter 14 arranged for each of the pixels (pixel units), a display side substrate 15, and a display side light-shielding film 16, which is formed on the MEMS shutter 14 side of the display side substrate 15.

The display unit 1 has a plurality of pixels (pixel units) (P1 to Pn shown in FIG. 1, for example). In a plan view, the plurality of pixels are arranged in a two-dimensional matrix. Each of the pixels in the display unit 1 emits light that corresponds to the respective pixel values of a video image (image) formed by a video signal (image signal), thereby displaying a video image (image) based on the video signal (image signal) on the display surface of the display unit 1 (the front surface of the display side substrate 15).

To illuminate the respective pixels of the display unit 1, the backlight unit 11 includes red (R) light sources, green (G) light sources, and blue (B) light sources. The backlight unit 11 receives the backlight control signal L_ctl from the display control unit 2. Based on the backlight control signal L_ctl, the backlight unit 11 makes the predetermined light sources emit light (the details are described later).

The light sources of the backlight unit 11 are arranged according to (1) or (2) below and may emit light from the backlight unit 11. These two arrangements are:

(1) The R light sources (red LED light source, for example), the G light sources (green LED light sources, for example), and blue light sources (blue LED light sources, for example) may be arranged approximately on the entire surface of the backlight surface (a surface having an approximately same shape as the display surface of the display unit 1 in a plan view and illuminating the respective pixels) in an approximately uniform manner, and the R light sources, the G light sources, and the B light sources arranged as described above may emit light; or (2) the R light sources (red LED light sources, for example), the G light sources (green LED light sources, for example), and the blue light sources (blue LED light sources, for example) may be arranged in a prescribed location, light from the light sources of each color may be diffused by a light guide plate (light guide sheet), a reflective plate (reflective sheet), light diffusion plate (light diffusion sheet), or the like, and light may be emitted from the backlight surface.

As shown in FIG. 1, the backlight side substrate 12 is arranged as to cover the backlight surface of the backlight unit 11. The backlight side substrate 12 is made of transparent material having high light transmissive characteristics, for example. This material can reduce loss of light from the backlight unit 11 when the light passes through the backlight side substrate 12.

The backlight side light-shielding film 13 is formed by material that can block light from the backlight unit 11 (aluminum, aluminum alloy, or the like, for example). The backlight side light-shielding film 13 is provided such that apertures are formed on the backlight side substrate 12. Specifically, the backlight side light-shielding film 13 is provided on the backlight side substrate 12 such that, for each pixel (each pixel unit), a prescribed optical path is formed by an aperture on the backlight side substrate 12 and apertures in the display side light-shielding film 16 provided on the display side substrate 15. The display side light-shielding film 16 is formed by metal wiring or the like used in a TFT array, which drives the MEMS shutter 14, for example.

As shown in FIG. 1, the MEMS shutter 14 is provided for each pixel and is controlled individually (pixel by pixel) by respective MEMS shutter control signals MEMS_ctl inputted from the display control unit 2.

Figure 2:
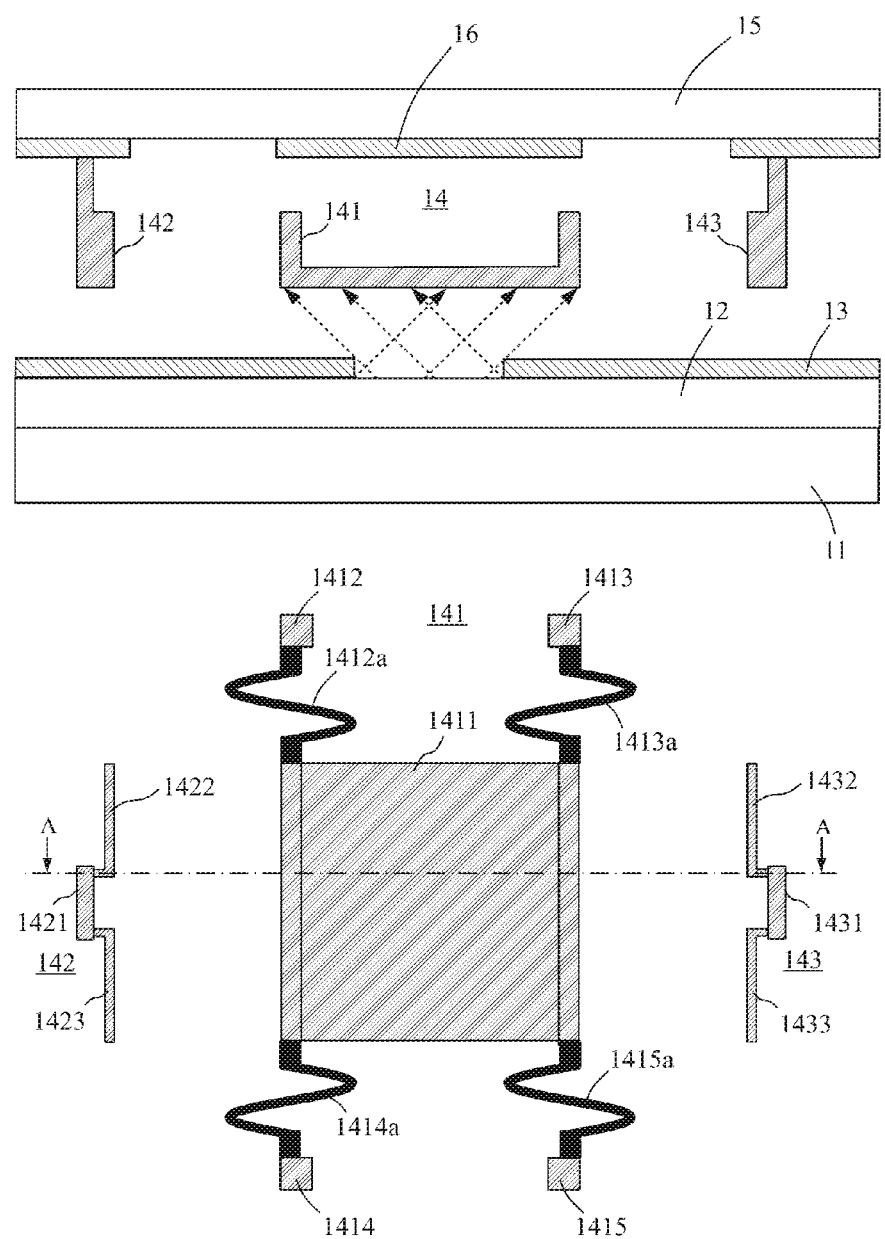
FIG. 2 is a schematic configuration diagram (the first state) of a backlight unit 11, a backlight side substrate 12, a backlight side light-shielding film 13, a MEMS shutter 14, a display side substrate 15, and the display side light-shielding film 16 in a pixel unit (one pixel) of the display device 1000 according to Embodiment 1.

FIG. 2 shows a schematic configuration (the first state) of the backlight unit 11, the backlight side substrate 12, the backlight side light-shielding film 13, the MEMS shutter 14, and the display side substrate 15, and the display side light-shielding film 16 in a pixel unit (one pixel). Specifically, the upper figure of FIG. 2 is a schematic configuration diagram of the display device 1000 in a manner similar to FIG. 1, and the lower figure of FIG. 2 is a schematic configuration diagram of the MEMS shutter 14 in a plan view. Also, the upper figure of FIG. 2 is a schematic cross-sectional view of the lower figure of FIG. 2 cut at the line A-A.

Figure 3:
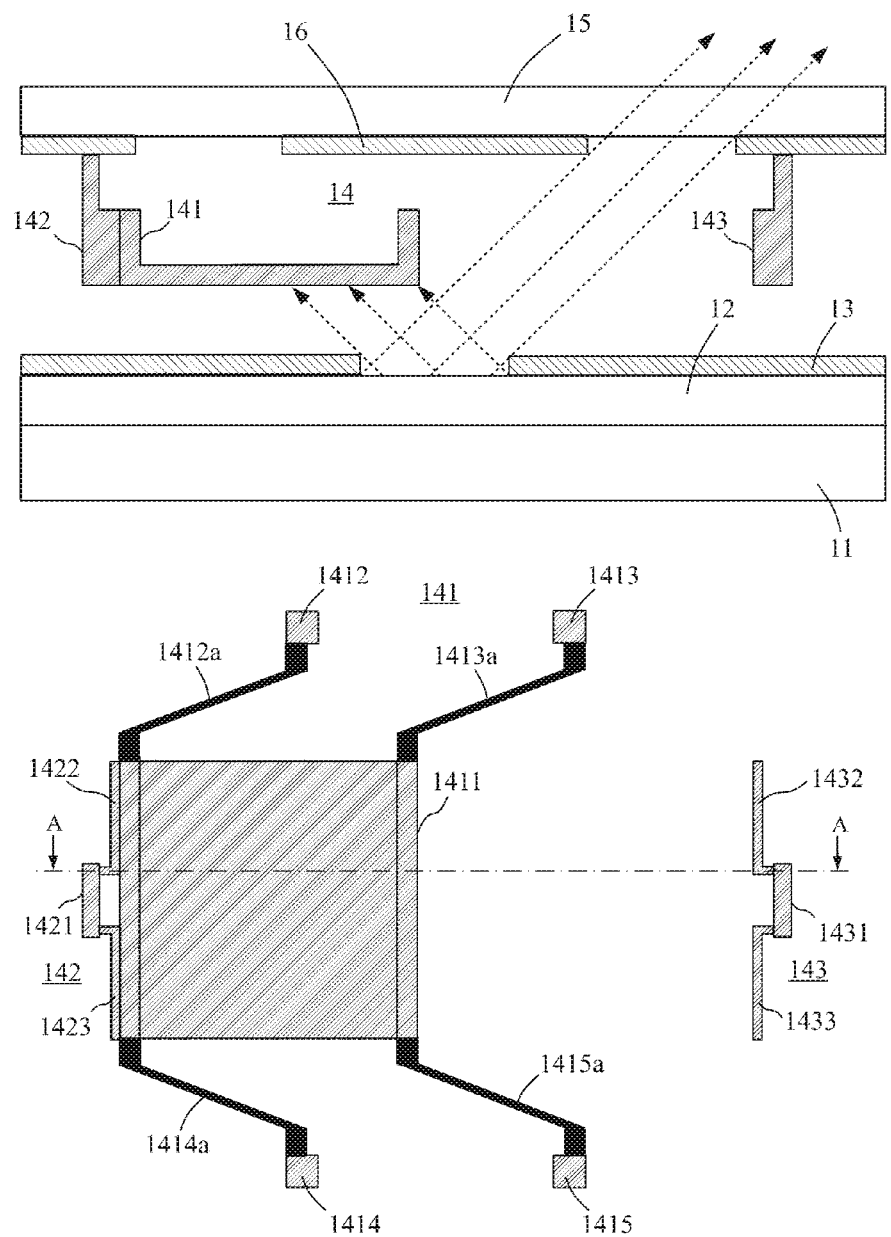
FIG. 3 is a schematic configuration diagram (the second state) of the backlight unit 11, the backlight side substrate 12, the backlight side light-shielding film 13, the MEMS shutter 14, the display side substrate 15, and a display side light-shielding film 16 in a pixel unit (one pixel) of the display device 1000 according to Embodiment 1.

FIG. 3 shows a schematic configuration (the second state) of the backlight unit 11, the backlight side substrate 12, the backlight side light-shielding film 13, the MEMS shutter 14, and the display side substrate 15, and the display side light-shielding film 16 in a pixel unit (one pixel). Specifically, the upper figure of FIG. 3 is a schematic configuration diagram of the display device 1000 in a manner similar to FIG. 1, and the lower figure of FIG. 3 is a schematic configuration diagram of the MEMS shutter 14 in a plan view. The upper figure of FIG. 3 is a schematic cross-sectional view of the lower figure of FIG. 3 cut along the line A-A.

Figure 4:
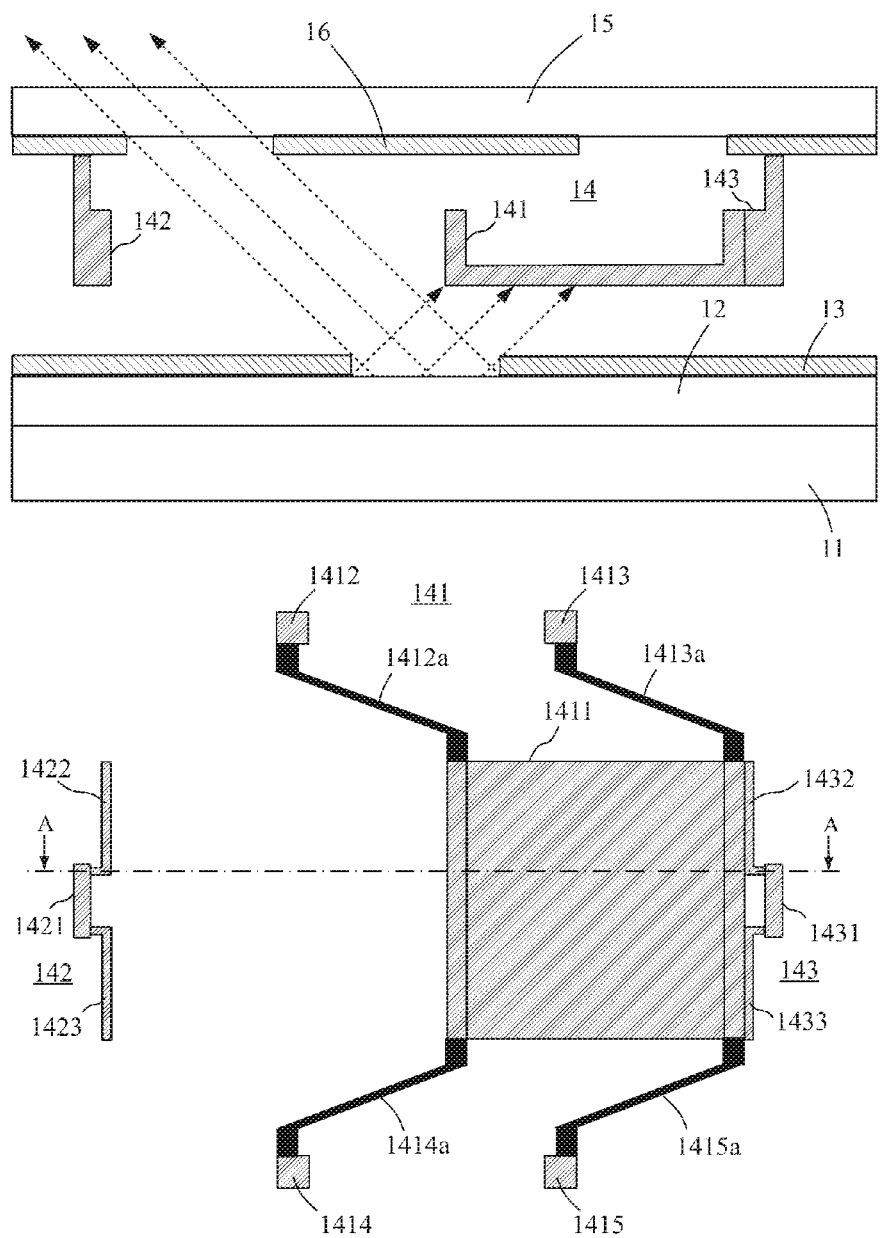
FIG. 4 is a schematic configuration diagram (the third state) of the backlight unit 11, the backlight side substrate 12, the backlight side light-shielding film 13, the MEMS shutter 14, the display side substrate 15, and the display side light-shielding film 16 in a pixel unit (one pixel) of the display device 1000 according to Embodiment 1.

FIG. 4 is a schematic configuration (the third state) of the backlight unit 11, the backlight side substrate 12, the backlight side light-shielding film 13, the MEMS shutter 14, and the display side substrate 15, and the display side light-shielding film 16 in a pixel unit (one pixel). Specifically, the upper figure of FIG. 4 is a schematic configuration diagram of the display device 1000 in a manner similar to FIG. 1, and the lower figure of FIG. 4 is a schematic configuration diagram of the MEMS shutter 14 in a plan view. The upper figure of FIG. 4 is a schematic cross-sectional view of the lower figure of FIG. 4 cut along the line A-A.

As shown in FIG. 2, the MEMS shutter 14 includes a shutter unit 141, a first electrode unit 142, and a second electrode unit 143, for example. As shown in FIG. 2, the first electrode unit 142 and the second electrode unit 143 of the MEMS shutter 14 are fixed to the display side light-shielding film 16, for example. In addition, shutter unit electrodes 1412, 1413, 1414, and 1415 described later are also fixed to the display side light-shielding film 16.

As shown in FIG. 2, the shutter unit 141 includes a shutter body 1411, the shutter unit electrodes 1412, 1413, 1414, and 1415, and shutter body elastic members 1412a, 1413a, 1414a, and 1415a.

The shutter body 1411 is made of conductive material and made of material that can adequately block light from the backlight. As shown in FIG. 2, the shutter body 1411 is formed in a U-shape in a cross-sectional view, for example.

As shown in FIG. 2, the shutter body 1411 is connected to the shutter unit electrode 1412 via the shutter unit elastic member 1412a. As shown in FIG. 2, the shutter body 1411 is connected to the shutter unit electrode 1413 via the shutter unit elastic member 1413a. As shown in FIG. 2, the shutter body 1411 is connected to the shutter unit electrode 1414 via the shutter unit elastic member 1414a. As shown in FIG. 2, the shutter body 1411 is connected to the shutter unit electrode 1415 via the shutter unit elastic member 1415a.

The shutter body 1411 can move between the first electrode unit 142 and the second electrode unit 143.

The shutter body 1411 can be charged in accordance with the electric potential of the shutter unit electrodes 1412 to 1415. Depending on the charge held by the first electrode unit 142 and/or the second electrode unit 143, the shutter body 1411 assumes one of the following three states.

(1) The shutter body 1411 assumes the state shown in FIG. 2 when no electric forces are in effect between the shutter body 1411 and the first electrode unit 142 and between the shutter body 1411 and the second electrode unit 143. As the upper figure in FIG. 2 shows, the shutter body 1411 completely blocks the optical path from the aperture provided in the backlight side light-shielding film 13 to the apertures provided in the display side light-shielding film 16 when the shutter body is in the state shown in FIG. 2. Thus, in this state shown in FIG. 2, light from the backlight is not emitted to the outside of the display unit.

(2) When an attractive force between the shutter body 1411 and the first electrode unit 142 is in effect (when the shutter body 1411 is positively charged, and the first electrode unit 142 is negatively charged, for example), the shape of the shutter body elastic members 1412a to 1415a changes to a shape that extends toward the first electrode unit 142 as shown in FIG. 3, and the edge of the shutter body 1411 on the first electrode unit 142 side touches the first electrode unit 142 as shown in FIG. 3. The shutter body 1411 blocks one of the two optical paths from the aperture provided in the backlight side light-shielding film 13 to the apertures provided in the display side light-shielding film 16 when the shutter body 1411 is in the state shown in FIG. 3. Thus, in this state shown in FIG. 3, only the light from the backlight that passes through one of the two optical paths described above is emitted to the outside of the display unit.

(3) When an attractive force between the shutter body 1411 and the second electrode unit 143 is in effect (when the shutter body 1411 is positively charged, and the second electrode unit 143 is negatively charged, for example), the shape of the shutter body elastic members 1412a to 1415a changes to a shape that extends toward the second electrode unit 143 as shown in FIG. 4, and the edge of the shutter body 1411 on the second electrode unit 143 side touches the first electrode unit 143 as shown in FIG. 4. The shutter body 1411 blocks one of the two optical paths from the aperture provided in the backlight side light-shielding film 13 to the apertures provided in the display side light-shielding film 16 when the shutter body is in the state shown in FIG. 4. Thus, in this state shown in FIG. 4, only the light from the backlight that passes through one of the two optical paths described above is emitted to the outside of the display unit.

The shape of the shutter body 1411 is not limited to the shapes shown in FIGS. 2 to 4. The shape of the shutter body may be different as long as the shutter body 1411 has a shape that can, in the first state described above, block light from the aperture provided in the backlight side light-shielding film 13 and, in the second and the third states, block one optical path while establishing another optical path in a manner similar to the first state.

Each of the shutter unit electrodes 1412, 1413, 1414, and 1415 is connected to the display control unit 2, and the display control unit 2 applies a prescribed voltage.

Each of the shutter body elastic members 1412a, 1413a, 1414a, and 1415a is made of material that is conductive and elastic. As described above, one end of each of the shutter body elastic members 1412a to 1415a is connected to the shutter body 1411. The other ends of the shutter body elastic members are connected to the respective shutter unit electrodes 1412 to 1415. Because the shutter body elastic members 1412a to 1415a are made of conductive material, if the shutter unit electrodes 1412 to 1415 are allowed to have positive potential, the shutter body 1411 becomes positively charged, and if the shutter unit electrodes 1412 to 1415 are allowed to have negative potential, the shutter body 1411 becomes negatively charged.

In the absence of any load (when no external forces are applied), the shutter body elastic members 1412a to 1415a assume the state shown in FIG. 2.

When an attractive force between the shutter body 1411 and the first electrode unit 142 is in effect (when the shutter body 1411 is positively charged, and the first electrode unit 142 is negatively charged, for example), the shape of the shutter body elastic members 1412a to 1415a changes to a shape that extends toward the first electrode unit 142 as shown in FIG. 3, and the edge of the shutter body 1411 on the first electrode unit 142 side touches the first electrode unit 142 as shown in FIG. 3.

When an attractive force between the shutter body 1411 and the second electrode unit 143 is in effect (when the shutter body 1411 is positively charged, and the second electrode unit 143 is negatively charged, for example), the shape of the shutter body elastic members 1412a to 1415a changes to a shape that extends toward the second electrode unit 143 as shown in FIG. 4, and the edge of the shutter body 1411 on the second electrode unit 143 side touches the second electrode unit 143 as shown in FIG. 4.

As shown in FIG. 2, the first electrode unit 142 includes a first electrode middle portion 1421 and first electrode extensions 1422 and 1423.

The first electrode middle portion 1421 is made of conductive material and connected to the first electrode extensions 1422 and 1423 as shown in FIG. 2.

The first electrode extensions 1422 and 1423 are made of conductive material and connected to the first electrode middle portion 1421 as shown in FIG. 2. The first electrode extensions 1422 and 1423 can be charged with electric charges of the same sign as the first electrode middle portion 1421 by allowing the first electrode middle portion 1421 to have a prescribed potential because the first electrode extensions are made of conductive material.

As shown in FIG. 2, the second electrode unit 143 includes a second electrode middle portion 1431 and second electrode extensions 1432 and 1433.

The second electrode middle portion 1431 is made of conductive material and connected to the second electrode extensions 1432 and 1433 as shown in FIG. 2.

The second electrode extensions 1432 and 1433 are made of conductive material and connected to the second electrode middle portion 1431 as shown in FIG. 2. The second electrode extensions 1432 and 1433 can be charged with electric charges of the same sign as the second electrode middle portion 1431 by allowing the second electrode middle portion 1431 to have a prescribed potential because the second electrode extensions are made of conductive material. An insulating film may be formed on one or both of the following pair of contact surfaces: the contact surface of the shutter body 1411 and the contact surface of the first electrode extensions 1422 and 1433, and the contact surface of the shutter body 1411 and the contact surfaces of the second electrode extensions 1432 and 1433. Forming the insulating film as described above allows the charged state to be maintained in a more stable manner.

As shown in FIG. 1, the display side substrate 15 is arranged as to cover the backlight side light-shielding film 13 of the backlight side substrate 12. The display side substrate 15 is made of transparent material having high light transmissive characteristics, for example. This material can reduce loss of light from the backlight unit 11 when the light passes through the display side substrate 15.

The display side light-shielding film 16 is formed by material that can block light from the backlight unit 11 (aluminum, aluminum alloy, metal wiring used in a TFT array or the like, for example). The display side light-shielding film 16 is provided such that apertures are formed on the display side substrate 15. Specifically, the display side light-shielding film 16 is provided on the display side substrate 15 such that, for each pixel (each pixel unit), a prescribed optical path is formed by an aperture on the backlight side substrate 12 and apertures in the display side light-shielding film 16.

The display control unit 2 controls the light from the backlight unit 11 in order to display input video signals (image signals) on the display surface of the display device. Also, in order to display input video signals (image signals) on the display surface of the display device, the display control unit 2 outputs the MEMS shutter control signal to the respective MEMS shutters 14 and applies prescribed respective voltages to the first electrode unit 142, the second electrode unit 143, and the shutter unit electrodes 1412 to 1415 for each of the pixels. In this way, the display control unit 2 controls the position of the shutter unit 141 (the details are described later).

<1.2: Operation of Display Device>

The operation of the display device 1000 configured as described above is described below.

Figure 5:
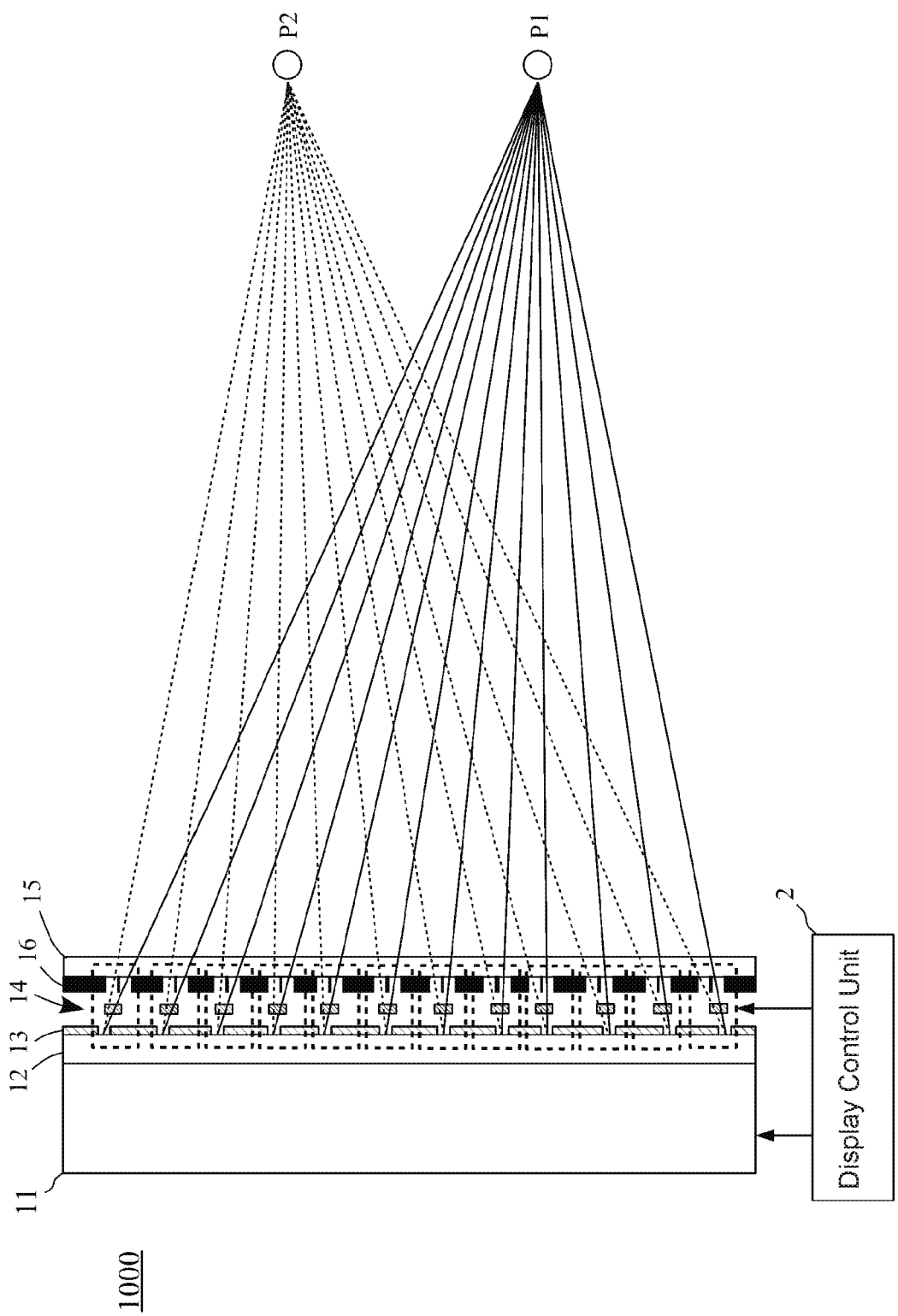
FIG. 5 is a view schematically showing the display device 1000 when two images (video images) are displayed by the display device 1000 and the relationship between two viewpoints, a first viewpoint P1 and a second viewpoint P2.

FIG. 5 is a view schematically showing the display device 1000 when two images (video images) are shown by the display device 1000, and the relationship between the two viewpoints, the first viewpoint P1 and the second viewpoint P2.

As shown in FIG. 5, for each pixel, one aperture is formed on the backlight side substrate 12 and two apertures are formed on the display side substrate 15.

For each pixel, the light passing through the aperture on the backlight side substrate 12 and the aperture on the display side substrate 15 on the first viewpoint P1 side (the lower side of FIG. 5) is emitted toward the first viewpoint P1. Because of this, the viewer can observe the first video image at the first viewpoint P1 (the video image formed by the light that is emitted passing through the optical path indicated by the solid lines in FIG. 5).

For each pixel, the light passing through the aperture in the backlight side substrate 12 and the aperture on the second viewpoint P2 side of the display side substrate 15 (the upper side of FIG. 5) is emitted toward the second viewpoint P2. Because of this, the viewer can observe the second video image at the second viewpoint P2 (the video image formed by the light that is emitted passing through the optical path indicated by the solid lines in FIG. 5).

As shown in FIG. 5, the description below uses as an example a case in which the display device 1000 displays a video image that allows the viewer to view two different video images (the first video image and the second video image) at two viewpoints (a stereoscopic image or a dual view image, for example).

First, based on the video signal Din that forms the first video image and the second video image, the display control unit 2 generates the backlight control signal L_ctl and the MEMS shutter control signal MEMS_ctl for controlling the backlight control signal L_ctl and the MEMS shutter 14.

Figure 6:
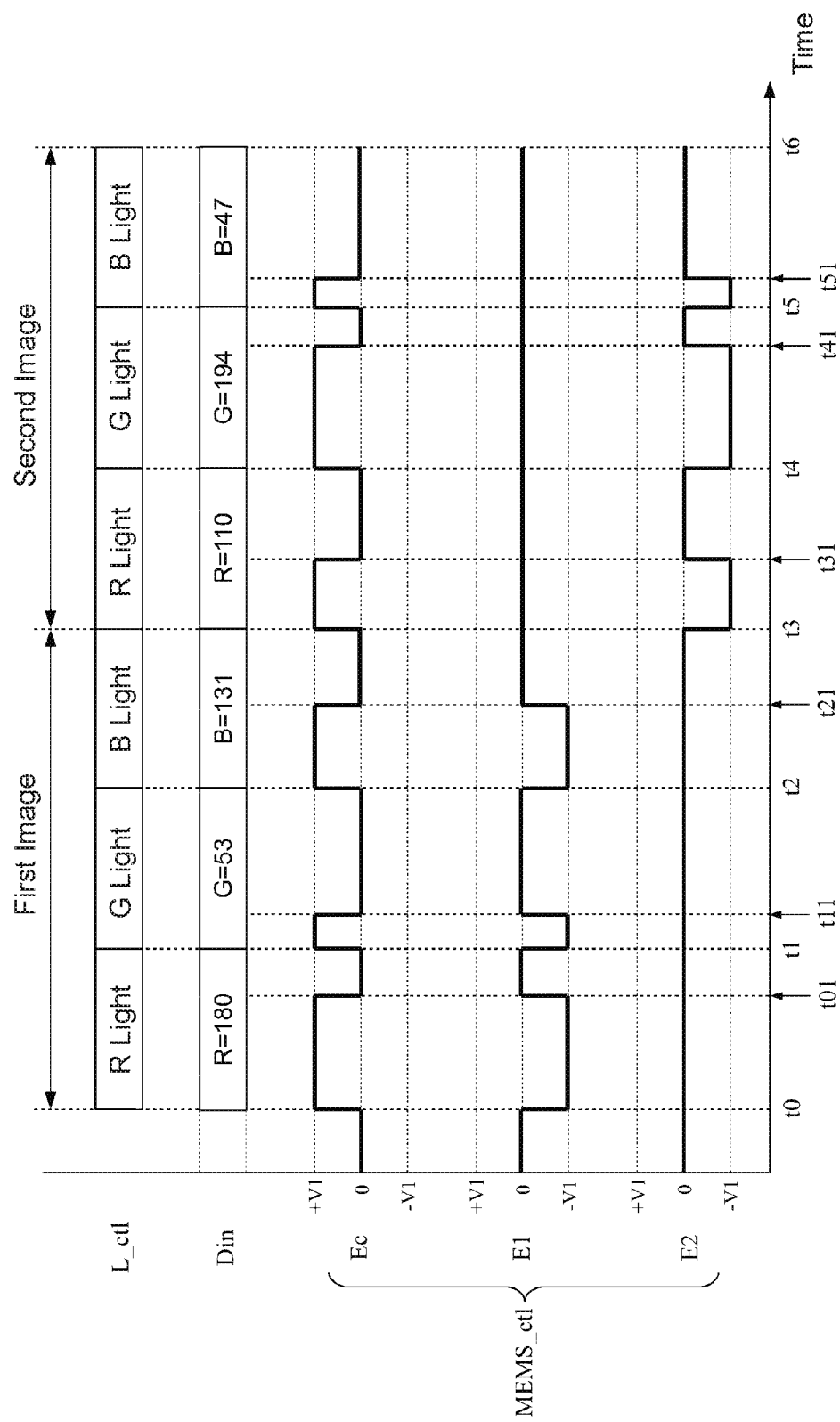
FIG. 6 is a timing chart (one example) showing the relationship between a video signal Din that forms a first video image and a second video image, a backlight control signal L_ctl, and a MEMS shutter control signal MEMS_ctl.

FIG. 6 is a timing chart (one example) showing the relationship between the video signal Din that forms the first video image and the second video image, the backlight control signal L_ctl, and the MEMS shutter control signal MEMS_ctl.

As shown in FIG. 6, the video signal Din is a signal in which the first video signal forming the first video image and the second video signal forming the second video image are multiplexed by time division. The signal value (pixel value) of each pixel is expressed by a red component value, a green component value, and a blue component value. In FIG. 6, the component values (the red component value, the green component value, and the blue component value) of a pixel for the video signal Din are shown inside the rectangles.

FIG. 6 shows a timing chart for one of the pixels when the pixel emits light that forms the first video image during the time interval t0 to t3 and emits light that forms the second video image during the time interval t3 to t6. Specifically, the timing chart shows a case in which a video image data having 1) the red component value=180, the green component value=53, and the blue component value=131 is shown during the interval t0 to t3 and 2) a video image data having the red component value=110, the green component value=194, and the blue component value=47 is shown during the interval t3 to t6.

The red component value, the green component value, and the blue component value are each 8 bits of data and assume a value between 0 and 255.

The MEMS shutter control signal MEMS_ctl shown in FIG. 6 includes a control signal Ec for controlling the potential of the shutter unit 141, a control signal E1 for controlling the potential of the first electrode unit 142, and a control signal E2 for controlling the potential of the second electrode unit 143.

The operation of the display device 1000 in the situation shown in FIG. 6 is described below.

<Display of First Video Image> (Time Interval t0 to t01)

At time t0, the display control unit 2 outputs to the backlight unit 11 the backlight control signal L_ctl that instructs the backlight unit to emit light from the red light source.

Based on the backlight control signal L_ctl inputted from the display control unit 2, the backlight unit 11 instructs the red light source to emit light, and the emitted red light illuminates the backlight side substrate 12.

The display control unit 2 also outputs the control signal Ec to the shutter unit electrodes 1412, 1413, 1414, and 1415 of the MEMS shutter 14 of a target pixel. In other words, as shown in FIG. 6, the display control unit 2 applies voltage +V1 (V1>0) between the shutter unit electrodes 1412, 1413, 1414, and 1415 and the ground GND during the time interval t0 to t01.

The display control unit 2 outputs the control signal E1 to the first electrode unit 142 of the MEMS shutter 14 of the target pixel. In other words, as shown in FIG. 6, the display control unit 2 applies voltage −V1 (V1>0) between the first electrode unit 142 and the ground GND during the time interval t0 to t01.

The display control unit 2 outputs the control signal E2 to the second electrode unit 143 of the MEMS shutter 14 of the target pixel. In other words, as shown in FIG. 6, the display control unit 2 sets the potential of the second electrode unit 143 to 0V (GND potential) during the time interval t0 to t01.

Because of these arrangements, the shutter body 1411 of the shutter unit 141 of the MEMS shutter 14 becomes positively charged, and the first electrode unit 142 becomes negatively charged. Thus, the attractive force that operates between the shutter body 1411 and the first electrode unit 142 pulls the shutter body 1411 toward the first electrode unit 142. As a result, the MEMS shutter 14 will be in the state shown in FIG. 3 (the second state). Here, there is also an attractive force between the shutter body 1411 and the second electrode unit 143. However, because the attractive force between the shutter body 1411 and the first electrode unit 142 is stronger than that force, the MEMS shutter will be in the state shown in FIG. 3.

As shown in FIG. 3, during the time interval t0 to t01, red light is emitted from the display surface of the display device 1000 to the outside thereof via the first optical path (the optical path toward the first viewpoint) because the MEMS shutter 14 maintains the state shown in FIG. 3 (the second state) during the time interval t0 to t01.

(Time Interval t01 to t1)

For the time interval t01 to t1, too, the backlight unit 11 continues to emit light from the red light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t01 to t1.

The display control unit 2 outputs the control signal E1 to the first electrode unit 142 of the MEMS shutter 14 of the target pixel. In other words, as shown in FIG. 6, the display control unit 2 sets the potential of the first electrode unit 142 also to 0V (GND potential) during the time interval t01 to t1.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t01 to t1.

Because of these arrangements, the shutter body 1411 of the shutter unit 141 of the MEMS shutter 14 will be in a state carrying no charge, and the first electrode unit 142 also will be in a state carrying no charge. Thus, the attractive force between the shutter body 1411 and the first electrode unit 142 no longer operates, and because of the elastic forces of the shutter body elastic members 1412a, 1413a, 1414a, and 1415a of the shutter unit 141, the MEMS shutter 14 will be in the state shown in FIG. 2 (the first state).

As shown in FIG. 2, during the time interval t01 to t1, red light from the backlight unit 11 is completely blocked because the MEMS shutter 14 maintains the state shown in FIG. 2 (the first state) during the time interval t01 to t1. In other words, light (red light) is not emitted to the outside of the display device from the target pixel.

Time t0, t01, and t1 satisfy the following relationship.

(Time Interval $t0$ to $t01$)/(Time Interval $t0$ to $t1$)=180/255

In other words, gradation value "180" of the red component value can be expressed by letting the red light emitted by the red light source of the backlight unit 11 pass (pass through the first optical path (the optical path toward the first viewpoint)) only for the time interval t0 to t01 and blocking the light during the time interval t01 to t1. In other words, the red component value (R=180) of the first video image can be displayed in the target pixel.

(Time Interval t1 to t11)

At time t1, the display control unit 2 outputs to the backlight unit 11 the backlight signal L_ctl that instructs the backlight unit to emit light from the green light source.

Based on the backlight control signal L_ctl inputted from the display control unit 2, the backlight unit 11 instructs the green light source to emit light, and the emitted green light illuminates the backlight side substrate 12.

The display control unit 2 also outputs the control signal Ec to the shutter unit electrodes 1412, 1413, 1414, and 1415 of the MEMS shutter 14 of a target pixel. In other words, as shown in FIG. 6, the display control unit 2 applies voltage +V1 (V1>0) between the shutter unit electrodes 1412, 1413, 1414, and 1415 and the ground GND during the time interval t1 to t11.

The display control unit 2 outputs the control signal E1 to the first electrode unit 142 of the MEMS shutter 14 of the target pixel. In other words, as shown in FIG. 6, the display control unit 2 applies voltage −V1 (V1>0) between the first electrode unit 142 and the ground GND during the time interval t1 to t11.

The display control unit 2 outputs the control signal E2 to the second electrode unit 143 of the MEMS shutter 14 of the target pixel. In other words, as shown in FIG. 6, the display control unit 2 sets the potential of the second electrode unit 143 to 0V (GND potential) during the time interval t1 to t11.

Because of these arrangements, the shutter body 1411 of the shutter unit 141 of the MEMS shutter 14 becomes positively charged, and the first electrode unit 142 becomes negatively charged. Thus, the attractive force that operates between the shutter body 1411 and the first electrode unit 142 pulls the shutter body 1411 toward the first electrode unit 142. As a result, the MEMS shutter 14 will be in the state shown in FIG. 3 (the second state). Here, there is also an attractive force between the shutter body 1411 and the second electrode unit 143. However, because the attractive force between the shutter body 1411 and the first electrode unit 142 is stronger than that force, the MEMS shutter will be in the state shown in FIG. 3.

As shown in FIG. 3, during the time interval t1 to t11, green light is emitted from the display surface of the display device 1000 to the outside thereof via the first optical path (the optical path toward the first viewpoint) because the MEMS shutter 14 maintains the state shown in FIG. 3 (the second state) during the time interval t1 to t11.

(Time Interval t11 to t2)

Also, for the time interval t11 to t2, the backlight unit 11 continues to emit light from the green light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t11 to t2.

The display control unit 2 outputs the control signal E1 to the first electrode unit 142 of the MEMS shutter 14 of the target pixel. In other words, as shown in FIG. 6, the display control unit 2 sets the potential of the first electrode unit 142 also to 0V (GND potential) during the time interval t11 to t2.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t11 to t2.

Because of these arrangements, the shutter body 1411 of the shutter unit 141 of the MEMS shutter 14 will be in a state carrying no charge, and the first electrode unit 142 also will be in a state carrying no charge. Thus, the attractive force between the shutter body 1411 and the first electrode unit 142 no longer operates, and because of the elastic forces of the shutter body elastic members 1412a, 1413a, 1414a, and 1415a of the shutter unit 141, the MEMS shutter 14 will be in the state shown in FIG. 2 (the first state).

As shown in FIG. 2, during the time interval t11 to t2, green light from the backlight unit 11 is completely blocked because the MEMS shutter 14 maintains the state shown in FIG. 2 (the first state) during the time interval t11 to t2. In other words, light (green light) is not emitted to the outside of the display device from the target pixel.

Time t1, t11, and t2 satisfy the following relationship.

(Time Interval *t*1 to *t*11)/(Time Interval *t*1 to *t*2)=53/ 255

In other words, gradation value "53" of the green component value can be expressed by letting the green light emitted by the green light source of the backlight unit 11 to pass (pass through the first optical path P1 (the optical path toward the first viewpoint)) only for the time interval t1 to t11 and blocking the light during the time interval t11 to t2. In other words, the green component value (G=53) of the first video image can be displayed in the target pixel.

(Time Interval t2 to t21)

At time t2, the display control unit 2 outputs to the backlight unit 11 the backlight signal L_ctl that instructs the backlight unit to emit light from the blue light source.

Based on the backlight control signal L_ctl inputted from the display control unit 2, the backlight unit 11 instructs the blue light source to emit light, and the emitted blue light illuminates the backlight side substrate 12.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 applies voltage +V1 (V1>0) between the shutter unit electrodes 1412, 1413, 1414, and 1415 and the ground GND during the time interval t2 to t21.

The display control unit 2 outputs the control signal E1 to the first electrode unit 142 of the MEMS shutter 14 of the target pixel. In other words, as shown in FIG. 6, the display control unit 2 applies voltage −V1 (V1>0) between the first electrode unit 142 and the ground GND during the time interval t2 to t21.

The display control unit 2 outputs the control signal E2 to the second electrode unit 143 of the MEMS shutter 14 of the target pixel. In other words, as shown in FIG. 6, the display control unit 2 sets the potential of the second electrode unit 143 to 0V (GND potential) during the time interval t2 to t21.

Because of these arrangements, the shutter body 1411 of the shutter unit 141 of the MEMS shutter 14 becomes positively charged, and the first electrode unit 142 becomes negatively charged. Thus, the attractive force that operates between the shutter body 1411 and the first electrode unit 142 pulls the shutter body 1411 toward the first electrode unit 142. As a result, the MEMS shutter 14 will be in the state shown in FIG. 3 (the second state). Here, there is also an attractive force between the shutter body 1411 and the second electrode unit 143. However, because the attractive force between the shutter body 1411 and the first electrode unit 142 is stronger than that force, the MEMS shutter will be in the state shown in FIG. 3.

As shown in FIG. 3, during the time interval t2 to t21, blue light is emitted from the display surface of the display device 1000 to the outside thereof via the first optical path (the optical path toward the first viewpoint) because the MEMS shutter 14 maintains the state shown in FIG. 3 (the second state) during the time interval t2 to t21.

(Time Interval t21 to t3)

Also, for the time interval t21 to t3, the backlight unit 11 continues to emit light from the blue light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t21 to t3.

The display control unit 2 outputs the control signal E1 to the first electrode unit 142 of the MEMS shutter 14 of the target pixel. In other words, as shown in FIG. 6, the display control unit 2 sets the potential of the first electrode unit 142 also to 0V (GND potential) during the time interval t21 to t3.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t21 to t3.

Because of these arrangements, the shutter body 1411 of the shutter unit 141 of the MEMS shutter 14 will be in a state carrying no charge, and the first electrode unit 142 also will be in a state carrying no charge. Thus, the attractive force between the shutter body 1411 and the first electrode unit 142 no longer operates, and because of the elastic forces of the shutter body elastic members 1412*a*, 1413*a*, 1414*a*, and 1415*a* of the shutter unit 141, the MEMS shutter 14 will be in the state shown in FIG. 2 (the first state).

As shown in FIG. 2, during the time interval t21 to t3, blue light from the backlight unit 11 is completely blocked because the MEMS shutter 14 maintains the state shown in FIG. 2 (the first state) during the time interval t21 to t3. In other words, light (blue light) is not emitted to the outside of the display device from the target pixel.

The times t2, t21, and t3 satisfy the following relationship.

(Time Interval *t*2 to *t*21)/(Time Interval *t*2 to *t*3)=131/255

In other words, gradation value "131" of the blue component value can be expressed by letting the blue light emitted by the blue light source of the backlight unit 11 pass (pass through the first optical path P1 (the optical path toward the first viewpoint)) only for the time interval t2 to t21 and blocking the light during the time interval t21 to t3. In other words, the blue component value (B=131) of the first video image can be displayed in the target pixel.

The time intervals t0 to t1, t1 to t2, and t2 to t3 are the same.

<Display of Second Video Image>

(Time Interval t3 to t31)

At time t3, the display control unit 2 outputs to the backlight unit 11 the backlight signal L_ctl that instructs the backlight unit to emit light from the red light source.

Based on the backlight control signal L_ctl inputted from the display control unit 2, the backlight unit 11 instructs the red light source to emit light, and the emitted red light illuminates the backlight side substrate 12.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 applies voltage +V1 (V1>0) between the shutter unit electrodes 1412, 1413, 1414, and 1415 and the ground GND during the time interval t3 to t31.

The display control unit 2 outputs the control signal E2 to the second electrode unit 143 of the MEMS shutter 14 of the target pixel. In other words, as shown in FIG. 6, the display control unit 2 applies voltage −V1 (V1>0) between the second electrode unit 143 and the ground GND during the time interval t3 to t31.

The display control unit 2 outputs the control signal E1 to the first electrode unit 142 of the MEMS shutter 14 of the target pixel. In other words, as shown in FIG. 6, the display control unit 2 sets the potential of the first electrode unit 142 to 0V (GND potential) during the time interval t3 to t31.

Because of these arrangements, the shutter body 1411 of the shutter unit 141 of the MEMS shutter 14 becomes positively charged, and the second electrode unit 143 becomes negatively charged. Thus, the attractive force that operates between the shutter body 1411 and the second electrode unit 143 pulls the shutter body 1411 toward the second electrode unit 143. As a result, the MEMS shutter 14 will be in the state shown in FIG. 4 (the third state). Here, there is also an attractive force between the shutter body 1411 and the first electrode unit 142. However, because the attractive force between the shutter body 1411 and the second electrode unit 143 is stronger than that force, the MEMS shutter will be in the state shown in FIG. 4.

As shown in FIG. 4, during the time interval t3 to t31, red light is emitted from the display surface of the display device 1000 to the outside thereof via the second optical path (the optical path toward the second viewpoint P2) because the MEMS shutter 14 maintains the state shown in FIG. 4 (the third state) during the time interval t3 to t31.

(Time Interval t31 to t4)

Also, for the time interval t31 to t4, the backlight unit 11 continues to emit light from the red light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t31 to t4.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t31 to t4.

The display control unit 2 outputs the control signal E1 to the first electrode unit 142 of the MEMS shutter 14 of a target pixel. In other words, as shown in FIG. 6, the display control unit 2 sets the potential of the first electrode unit 142 also to 0V (GND potential) during the time interval t31 to t4.

Because of these arrangements, the shutter body 1411 of the shutter unit 141 of the MEMS shutter 14 will be in a state carrying no charge, and the second electrode unit 143 also will be in a state carrying no charge. Thus, the attractive force between the shutter body 1411 and the second electrode unit 143 no longer operates, and because of the elastic forces of the shutter body elastic members 1412a, 1413a, 1414a, and 1415a of the shutter unit 141, the MEMS shutter 14 will be in the state shown in FIG. 2 (the first state).

As shown in FIG. 2, during the time interval t31 to t4, red light from the backlight unit 11 is completely blocked because the MEMS shutter 14 maintains the state shown in FIG. 2 (the first state) during the time interval t31 to t4. In other words, light (red light) is not emitted to the outside of the display device from the target pixel.

Time t3, t31, and t4 satisfy the following relationship.

(Time Interval $t3$ to $t31$)/(Time Interval $t3$ to $t4$)=110/255

In other words, gradation value "110" of the red component value can be expressed by letting the red light emitted by the red light source of the backlight unit 11 pass (pass through the second optical path (the optical path toward the second viewpoint P2)) only for the time interval t3 to t31 and blocking the light during the time interval t31 to t4. In other words, the red component value (R=110) of the second video image can be displayed in the target pixel.

(Time Interval t4 to t41)

At time t4, the display control unit 2 outputs to the backlight unit 11 the backlight signal L_ctl that instructs the backlight unit to emit light from the green light source.

Based on the backlight control signal L_ctl inputted from the display control unit 2, the backlight unit 11 instructs the green light source to emit light, and the emitted green light illuminates the backlight side substrate 12.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 applies voltage +V1 (V1>0) between the shutter unit electrodes 1412, 1413, 1414, and 1415 and the ground GND during the time interval t4 to t41.

The display control unit 2 outputs the control signal E2 to the second electrode unit 143 of the MEMS shutter 14 of the target pixel. In other words, as shown in FIG. 6, the display control unit 2 applies voltage −V1 (V1>0) between the second electrode unit 143 and the ground GND during the time interval t4 to t41.

The display control unit 2 outputs the control signal E1 to the first electrode unit 142 of the MEMS shutter 14 of the target pixel. In other words, as shown in FIG. 6, the display control unit 2 sets the potential of the first electrode unit 142 to 0V (GND potential) during the time interval t4 to t41.

Because of these arrangements, the shutter body 1411 of the shutter unit 141 of the MEMS shutter 14 becomes positively charged, and the second electrode unit 143 becomes negatively charged. Thus, the attractive force that operates between the shutter body 1411 and the second electrode unit 143 pulls the shutter body 1411 toward the second electrode unit 143. As a result, the MEMS shutter 14 will be in the state shown in FIG. 4 (the third state). Here, there is also an attractive force between the shutter body 1411 and the first electrode unit 142. However, because the attractive force between the shutter body 1411 and the second electrode unit 143 is stronger than that force, the MEMS shutter will be in the state shown in FIG. 4.

As shown in FIG. 4, during the time interval t4 to t41, green light is emitted from the display surface of the display device 1000 to the outside thereof via the second optical path (the optical path toward the second viewpoint P2) because the MEMS shutter 14 maintains the state shown in FIG. 4 (the third state) during the time interval t4 to t41.

(Time Interval t41 to t5)

Also, for the time interval t41 to t5, the backlight unit 11 continues to emit light from the green light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t41 to t5.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t41 to t5.

The display control unit 2 outputs the control signal E1 to the first electrode unit 142 of the MEMS shutter 14 of the target pixel. In other words, as shown in FIG. 6, the display control unit 2 sets the potential of the first electrode unit 142 also to 0V (GND potential) during the time interval t41 to t5.

Because of these arrangements, the shutter body 1411 of the shutter unit 141 of the MEMS shutter 14 will be in a state carrying no charge, and the second electrode unit 143 also will be in a state carrying no charge. Thus, the attractive force between the shutter body 1411 and the second electrode unit 143 no longer operates, and because of the elastic forces of the shutter body elastic members 1412a, 1413a, 1414a, and 1415a of the shutter unit 141, the MEMS shutter 14 will be in the state shown in FIG. 2 (the first state).

As shown in FIG. 2, during the time interval t41 to t5, green light from the backlight unit 11 is completely blocked because the MEMS shutter 14 maintains the state shown in FIG. 2 (the first state) during the time interval t41 to t5. In other words, light (green light) is not emitted to the outside of the display device from the target pixel.

Time t4, t41, and t5 satisfy the following relationship.

(Time Interval $t4$ to $t41$)/(Time Interval $t4$ to $t5$)=194/255

In other words, gradation value "194" of the green component value can be expressed by letting the green light emitted by the green light source of the backlight unit 11 pass (pass through the second optical path (the optical path toward the second viewpoint P2)) only for the time interval t4 to t41 and blocking the light during the time interval t41 to t5. In other words, the green component value (G=194) of the second video image can be displayed in the target pixel.

(Time Interval t5 to t51)

At time t5, the display control unit 2 outputs to the backlight unit 11 the backlight signal L_ctl, which instructs the backlight unit to emit light from the blue light source.

Based on the backlight control signal L_ctl inputted from the display control unit 2, the backlight unit 11 instructs the blue light source to emit light, and the emitted blue light illuminates the backlight side substrate 12.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 applies voltage +V1 (V1>0) between the shutter unit electrodes 1412, 1413, 1414, and 1415 and the ground GND during the time interval t5 to t51.

The display control unit 2 outputs the control signal E2 to the second electrode unit 143 of the MEMS shutter 14 of the target pixel. In other words, as shown in FIG. 6, the display control unit 2 applies voltage −V1 (V1>0) between the second electrode unit 143 and the ground GND during the time interval t5 to t51.

The display control unit 2 outputs the control signal E1 to the first electrode unit 142 of the MEMS shutter 14 of the target pixel. In other words, as shown in FIG. 6, the display control unit 2 sets the potential of the first electrode unit 142 to 0V (GND potential) during the time interval t5 to t51.

Because of these arrangements, the shutter body 1411 of the shutter unit 141 of the MEMS shutter 14 becomes positively charged, and the second electrode unit 143 becomes negatively charged. Thus, the attractive force that operates between the shutter body 1411 and the second electrode unit 143 pulls the shutter body 1411 toward the second electrode unit 143. As a result, the MEMS shutter 14 will be in the state shown in FIG. 4 (the third state). Here, there is also an attractive force between the shutter body 1411 and the first electrode unit 142. However, because the attractive force between the shutter body 1411 and the second electrode unit 143 is stronger than that force, the MEMS shutter will be in the state shown in FIG. 4.

As shown in FIG. 4, during the time interval t5 to t51, blue light is emitted from the display surface of the display device 1000 to the outside thereof via the second optical path (the optical path toward the second viewpoint P2) because the MEMS shutter 14 maintains the state shown in FIG. 4 (the third state) during the time interval t5 to t51.

(Time Interval t51 to t6)

Also, for the time interval t51 to t6, the backlight unit 11 continues to emit light from the blue light source based on the backlight control signal L_ctl inputted from the display control unit 2.

The display control unit 2 also outputs the control signal Ec to the shutter unit electrodes 1412, 1413, 1414, and 1415 of the MEMS shutter 14 of the target pixel. In other words, as shown in FIG. 6, the display control unit 2 sets the potential of the shutter unit electrodes 1412, 1413, 1414, and 1415 to 0V (GND potential) during the time interval t51 to t6.

The display control unit 2 outputs the control signal E2 to the second electrode unit 143 of the MEMS shutter 14 of the target pixel. In other words, as shown in FIG. 6, the display control unit 2 sets the potential of the second electrode unit 143 also to 0V (GND potential) during the time interval t51 to t6.

The display control unit 2 outputs the control signal E1 to the first electrode unit 142 of the MEMS shutter 14 of the target pixel. In other words, as shown in FIG. 6, the display control unit 2 sets the potential of the first electrode unit 142 also to 0V (GND potential) during the time interval t51 to t6.

Because of these arrangements, the shutter body 1411 of the shutter unit 141 of the MEMS shutter 14 will be in a state carrying no charge, and the second electrode unit 143 also will be in a state carrying no charge. Thus, the attractive force between the shutter body 1411 and the second electrode unit 143 no longer operates, and because of the elastic forces of the shutter body elastic members 1412a, 1413a, 1414a, and 1415a of the shutter unit 141, the MEMS shutter 14 will be in the state shown in FIG. 2 (the first state).

As shown in FIG. 2, during the time interval t51 to t6, blue light from the backlight unit 11 is completely blocked because the MEMS shutter 14 maintains the state shown in FIG. 2 (the first state) during the time interval t51 to t6. In other words, light (blue light) is not emitted to the outside of the display device from the target pixel.

Time interval t5, t51, and t6 satisfy the following relationship.

(Time Interval $t5$ to $t51$)/(Time Interval $t5$ to $t6$)=47/255

In other words, gradation value "47" of the blue component value can be expressed by letting the blue light emitted by the blue light source of the backlight unit 11 pass (pass through the second optical path (the optical path toward the second viewpoint P2)) only for the time interval t5 to t51 and blocking the light during the time interval t51 to t6. In other words, the blue component value (B=47) of the second video image can be displayed in the target pixel.

The time intervals t3 to t4, t4 to t5, and t5 to t6 are the same.

By repeating the processes similar to those described above after time t6, the display device 1000 can use one pixel (pixel unit) to display both the pixel value for the first video image and the pixel value for the second video image using time division.

As described above, the display device 1000 includes, in one pixel unit, one aperture on the backlight side substrate 12, two apertures on the display side substrate 15, and two optical paths for emitting light from the backlight (the first optical path and the second optical path). In the display device 1000, as described above, the display control unit 2 controls the location of the shutter body 1411 of the MEMS shutter 14 in each pixel and can either choose the path that light from the backlight passes through or block light from the backlight completely.

In other words, by controlling the MEMS shutter 14 in each of the pixels, the display device 1000 can control the passing and blocking of light that is emitted toward two different directions (the direction toward the first viewpoint P1 and the direction toward the second viewpoint P2). With this ability to control light, the display device 1000 can express, in each of the pixels, the respective pixel values of the video image, or in other words the gradation of the video image.

In other words, by controlling the MEMS shutter 14 in each of the pixels, the display device 1000 can emit desired light toward two different directions (the direction toward the first viewpoint P1 and the direction toward the second viewpoint P2). Because of this, the display device 1000 can display two video images (the first video image and the second video image) in two different directions (the direction toward the first viewpoint P1 and the direction toward the second viewpoint P2).

In addition, as described above, the display device 1000 can choose between two optical paths (in time division) using one pixel by controlling the MEMS shutter 14. Thus, when displaying a stereoscopic image, the display device does not require two types of pixels, one for the image for the right eye and another for the image for the left eye, as in the case of the conventional technology, for example. In other words, the display device 1000 can display a video image using all of the pixels provided in the device. Thus, the display device 1000 does not suffer from reduced resolution like the conventional stereoscopic image display device, in which the resolution of the displayed video image is reduced by half with respect to the number of pixels provided in the device.

Furthermore, the display device 1000 does not require, as the conventional technology does, a parallax barrier, a lenticular lens, a polarizing plate, a color filter, liquid crystal elements used for pixels for the image for the right eye and pixels for the image for the left eye, and the like because the display device can use the MEMS shutter 14, as described above, to display two video images in two different directions (a stereoscopic image or dual view image, for example). The display device 1000 simply uses the MEMS shutter 14 to allow light from the backlight to pass or to block light from the backlight. Thus, compared to the conventional technology, there is little loss of light (the lowering of transmittance) when the light passes through the liquid crystal, the polarizing plates, and the color filter. Thus, compared to the conventional technology, the display device 1000 can be made at a lower cost and the light transmittance of each pixel can be increased.

Embodiment 2

Next, Embodiment 2 will be described.

Below, parts particular to the present embodiment will be described, and the detailed description of the parts similar to the embodiment described above will be omitted.

Figure 7:
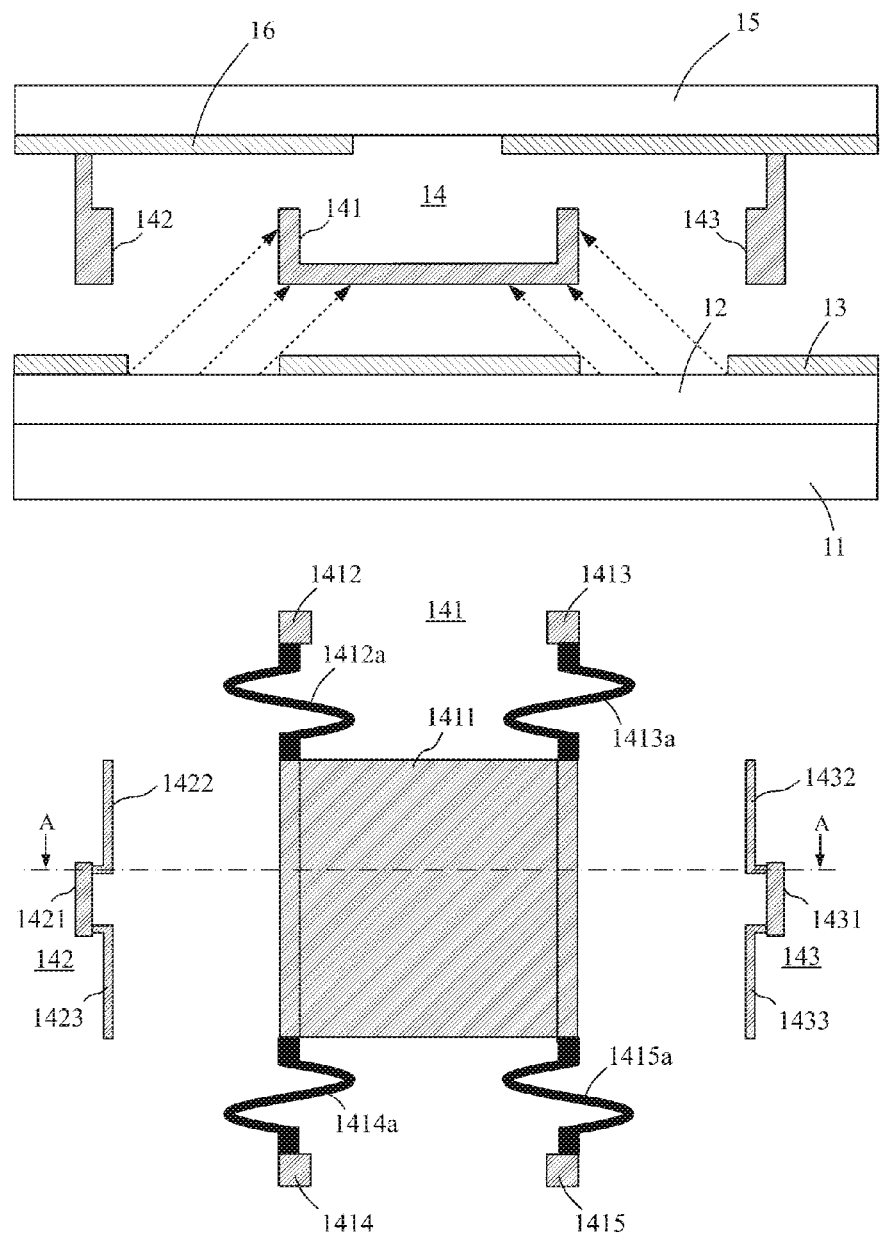
FIG. 7 is a schematic configuration diagram (the first state) of a backlight unit 11, a backlight side substrate 12, a backlight side light-shielding film 13, a MEMS shutter 14, a display side substrate 15, and a display side light-shielding film 16 in a pixel unit (one pixel) of the display device 1000 according to Embodiment 2.

FIG. 7 shows a schematic configuration (the first state) of a pixel unit (one pixel) showing a backlight unit 11, a backlight side substrate 12, a backlight side light-shielding film 13, a MEMS shutter 14, and a display side substrate 15, and a display side light-shielding film 16. Specifically, the upper figure of FIG. 7 is a schematic cross-sectional view of one pixel in the display device according to the present embodiment, and the lower figure of FIG. 7 is a schematic configuration diagram of the MEMS shutter 14 in a plan view. The upper figure of FIG. 7 is a schematic cross-sectional view of the lower figure of FIG. 7 cut along the line A-A.

Figure 8:
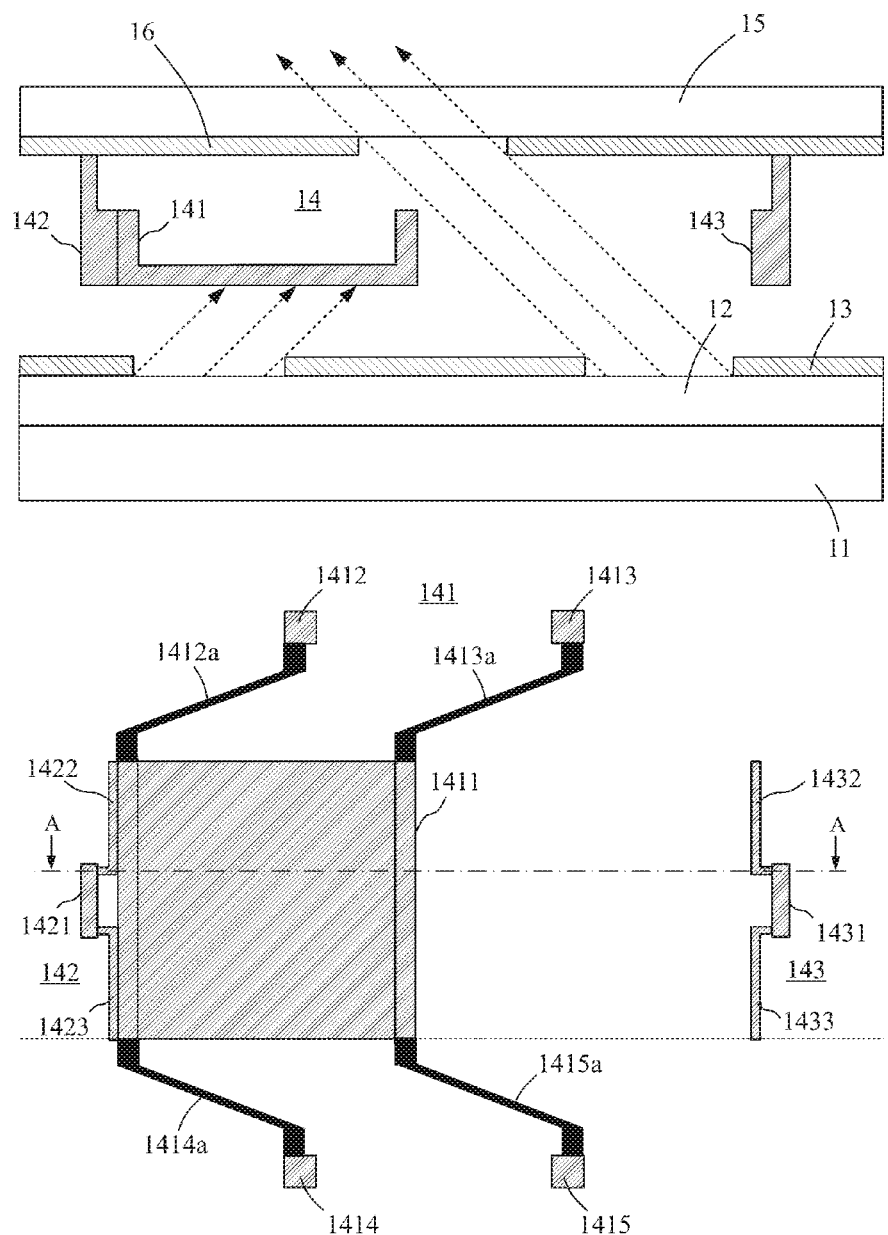
FIG. 8 is a schematic configuration diagram (the second state) of the backlight unit 11, the backlight side substrate 12, the backlight side light-shielding film 13, the MEMS shutter 14, the display side substrate 15, and the display side light-shielding film 16 in a pixel unit (one pixel) of the display device 1000 according to Embodiment 2.

FIG. 8 shows a schematic configuration (the second state) of a pixel unit (one pixel) showing the backlight unit 11, the backlight side substrate 12, the backlight side light-shielding film 13, the MEMS shutter 14, the display side substrate 15, and the display side light-shielding film 16. Specifically, the upper figure of FIG. 8 is a schematic cross-sectional view of the display device according to the present embodiment, and the lower figure of FIG. 8 is a schematic configuration diagram of the MEMS shutter 14 in a plan view. The upper figure of FIG. 8 is a schematic cross-sectional view of the lower figure of FIG. 8 cut along the line A-A.

Figure 9:
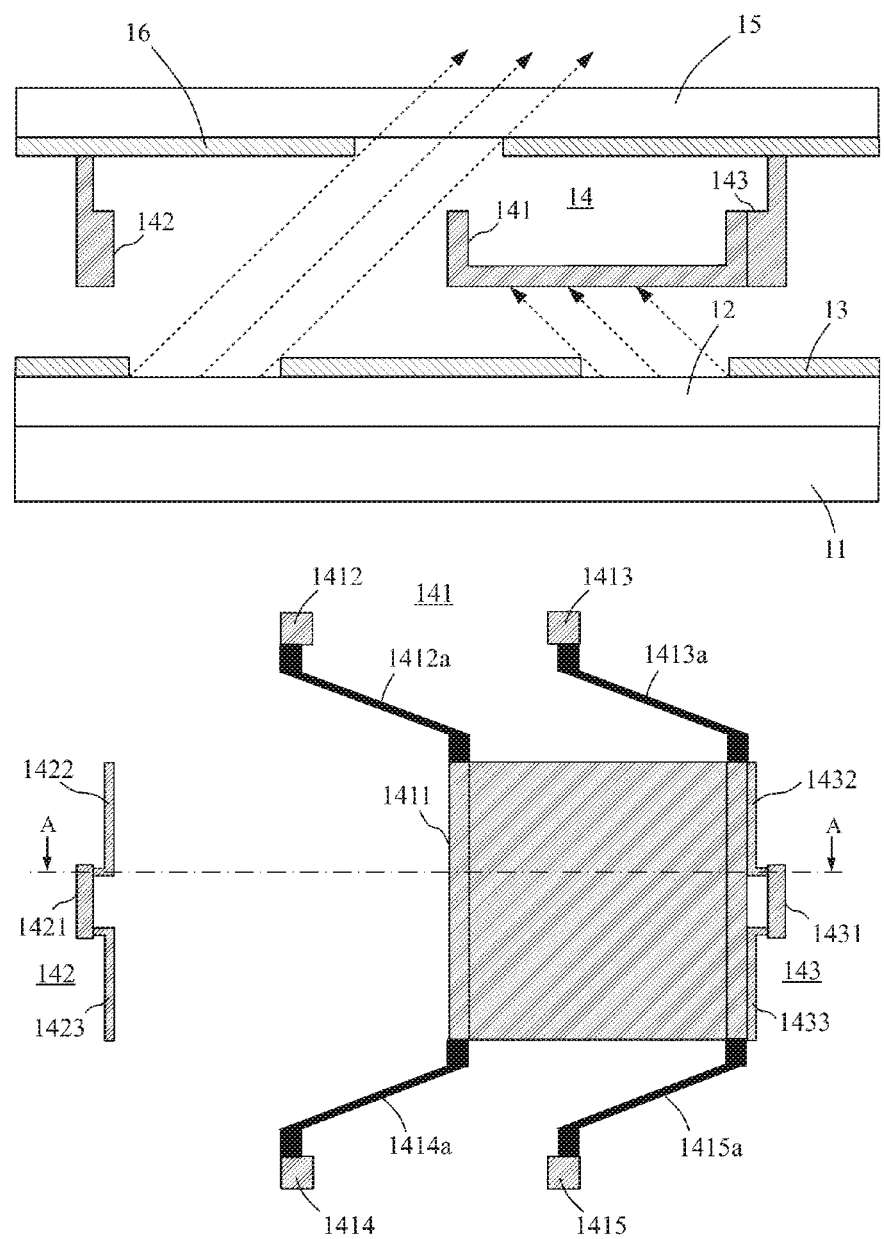
FIG. 9 is a schematic configuration diagram (the third state) of the backlight unit 11, the backlight side substrate 12, the backlight side light-shielding film 13, the MEMS shutter 14, the display side substrate 15, and the display side light-shielding film 16 in a pixel unit (one pixel) of the display device 1000 according to Embodiment 2.

FIG. 9 shows a schematic configuration (the third state) of a pixel unit (one pixel) showing the backlight unit 11, the backlight side substrate 12, the backlight side light-shielding film 13, the MEMS shutter 14, the display side substrate 15, and the display side light-shielding film 16. Specifically, the upper figure of FIG. 9 is a schematic cross-sectional view of the display device according to the present embodiment, and the lower figure of FIG. 9 is a schematic configuration diagram of the MEMS shutter 14 in a plan view. The upper figure of FIG. 9 is a schematic cross-sectional view of the lower figure of FIG. 9 cut along the line A-A.

In the display device 1000 according to Embodiment 1, for each pixel, one aperture was provided on the backlight side substrate 12, and two apertures were provided on the display side substrate 15. However, as shown in FIGS. 7 to 9, in the display device according to Embodiment 2, for each pixel, two apertures are provided on the backlight side substrate 12, and one aperture is provided on the display side substrate 15. In this regard, the display device of the present embodiment differs from the display device 1000 of Embodiment 1.

In the state shown in FIG. 8 (the second state), light from the backlight is emitted from a pixel in the display device according to the present embodiment toward the second viewpoint P2.

In the state shown in FIG. 9 (the third state), light from the backlight is emitted from a pixel in the display device according to the present embodiment toward the first viewpoint P1.

In other words, in the display device according to the present embodiment, the first video image (video image toward the first viewpoint) is displayed when a shutter body 1411 is located at a second electrode unit 143 side, and the second video image (video image toward the second viewpoint) is displayed when the shutter body 1411 is located at a first electrode unit 142 side. In other words, the relationship between the video images displayed in the present embodiment and the location of the shutter body 1411 is going to be opposite to that in Embodiment 1.

Thus, when displaying the video signal Din shown in FIG. 6 in the display device according to the present embodiment, the present embodiment needs to invert the location setting of the shutter body 1411 from that in Embodiment 1.

Figure 10:
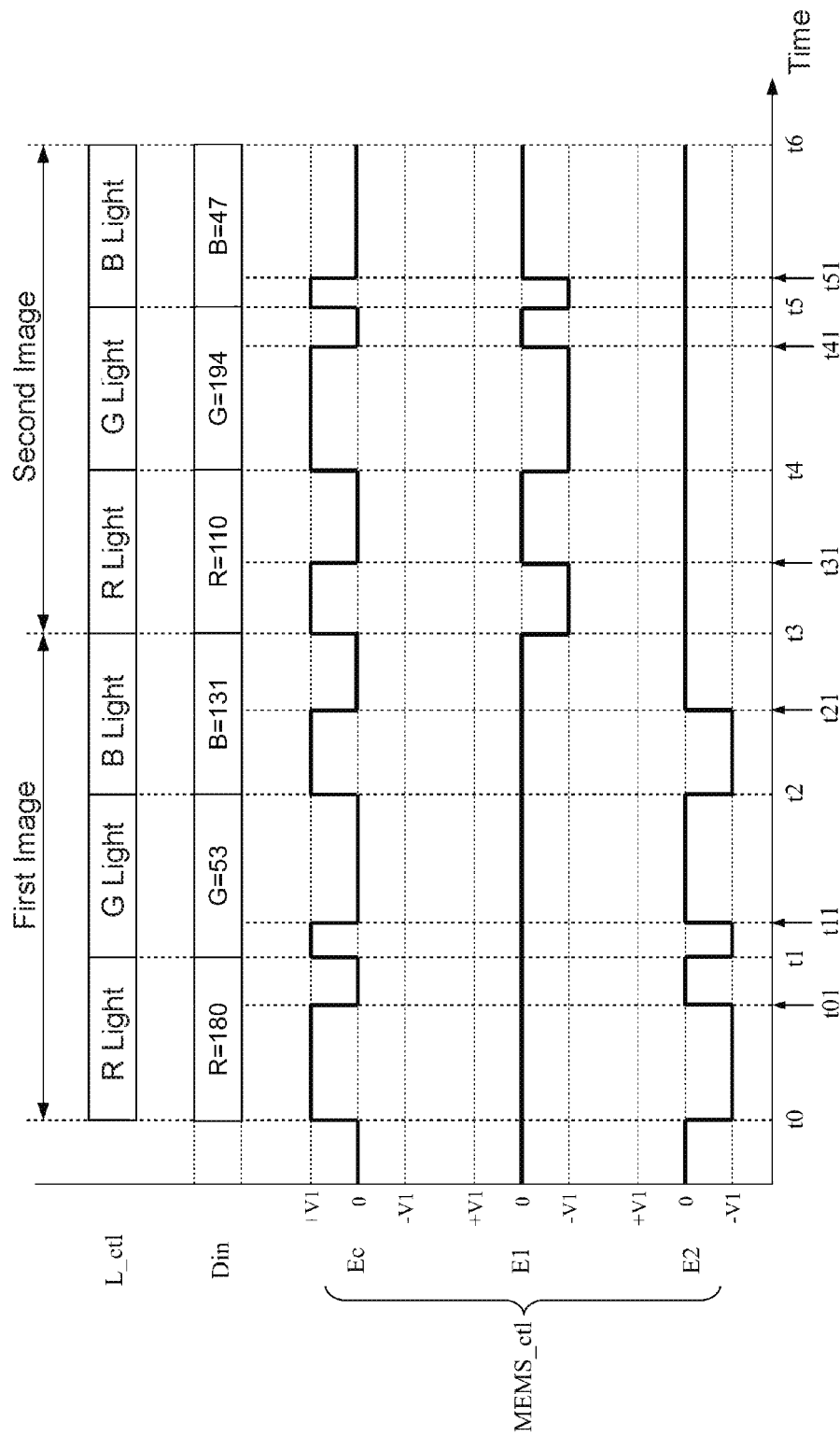
FIG. 10 is a timing chart diagram when displaying a video signal Din in the display device according to Embodiment 2.

FIG. 10 is a timing chart diagram when the display device according to the present embodiment displays the video signal Din shown in FIG. 6.

As shown in FIG. 10, during the time interval t0 to t3 (the interval during which the first video image is displayed), the signal waveform of a control signal E1 for controlling the potential of the first electrode unit 142 of the display device according to the present embodiment is the same as the signal waveform of the control signal E2 for controlling the potential of the second electrode unit 143 of the display device 1000 according to Embodiment 1.

During the time interval t0 to t3, the signal waveform of the control signal E2 for controlling the potential of the second electrode unit 143 of the display device according to the present embodiment is the same as the signal waveform of the control signal E1 for controlling the potential of the first electrode unit 142 of the display device 1000 according to Embodiment 1.

As shown in FIG. 10, during the time interval t3 to t6 (the interval during which the second video image is displayed), the signal waveform of a control signal E1 for controlling the potential of the first electrode unit 142 of the display device according to the present embodiment is the same as the signal waveform of the control signal E2 for controlling the potential of the second electrode unit 143 of the display device 1000 according to Embodiment 1.

During the time interval t3 to t6, the signal waveform of the control signal E2 for controlling the potential of the second electrode unit 143 of the display device according to the present embodiment is the same as the signal waveform of the control signal E1 for controlling the potential of the first electrode unit 142 of the display device 1000 according to Embodiment 1.

In a manner similar to Embodiment 1, the display device according to the present embodiment can instruct the display device according to the present embodiment to display the video signal Din by controlling the MEMS shutter 14 using the MEMS shutter control signal MEMS_ctl shown in FIG. 10.

Because the details of the control process in the display device according to the present embodiment are the same as those in Embodiment 1, the descriptions thereof are omitted.

As described above, the display device according to the present embodiment includes, in one pixel unit, two apertures on the backlight side substrate 12, one aperture on the display side substrate 15, and two optical paths (the first optical path and the second optical path) for emitting light from the backlight. In the display device according to the present embodiment, the display control unit 2 can control the location of the shutter 1411 of the MEMS shutter 14 in each pixel, and the path that light from the backlight passes through can be chosen, or light from the backlight can be blocked completely.

In other words, by controlling the MEMS shutter 14 in each of the pixels, the display device according to the present embodiment can control the passing and blocking of light that is emitted toward two different directions (the direction toward the first viewpoint P1 and the direction toward the second viewpoint P2). With this ability to control light, the display device according to the present embodiment can express, in each of the pixels, the respective pixel values of the video image, or in other words the gradation of the video image.

In other words, by controlling the MEMS shutter 14 in each of the pixels, the display device according to the present embodiment can emit desired light toward two different directions (the direction toward the first viewpoint P1 and the direction toward the second viewpoint P2). Because of this, the display device according to the present embodiment can display two video images (the first video image and the second video image) in two different directions (the direction toward the first viewpoint P1 and the direction toward the second viewpoint P2).

In addition, as described above, the display device according to the present embodiment can choose between two optical paths (in time division) using one pixel by controlling the MEMS shutter 14. Thus, when displaying a stereoscopic image, the display device does not require two types of pixels, one for the image for the right eye and another for the image for the left eye, as in the case of the conventional technology, for example. In other words, the display device according to the present embodiment can display a video image using all of the pixels provided in the device. Thus, the display device according to the present embodiment does not suffer from reduced resolution like the conventional stereoscopic image display device, in which the resolution of the displayed video image is reduced by half with respect to the number of pixels provided in the device.

Furthermore, the display device according to the present embodiment does not require, as the conventional technology does, a parallax barrier, a lenticular lens, a polarizing plate, a color filter, liquid crystal elements used for pixels for the image for the right eye and for pixels for the image for the left eye, and the like because the display device can use the MEMS shutter 14, as described above, to display two video images in two different directions (a stereoscopic image or dual view image, for example). The display device according to the present embodiment simply uses the MEMS shutter 14 to allow light from the backlight to pass or to block light from the backlight. Thus, compared to the conventional technology, there is little loss of light (the lowering of transmittance) when the light passes through the liquid crystal, the polarizing plates, and the color filter. Thus, compared to the conventional technology, the display device according to the present embodiment can be made at a lower cost and the light transmittance of each pixel can be increased.

Embodiment 3

Next, Embodiment 3 will be described.

Below, parts particular to the present embodiment will be described, and the detailed description of the parts similar to the embodiment described above will be omitted.

The display device according to the present embodiment has a configuration in which the MEMS shutter 14 provided in each pixel in the display device 1000 according to Embodiment 1 is replaced by a MEMS shutter 14A.

Also, in a pixel of the display device according to the present embodiment, the shape and the area of one aperture provided on the backlight side substrate and the shape and the area of two apertures provided in the display side substrate 15 differ from those in the display device 1000 according to Embodiment 1.

Figure 11:
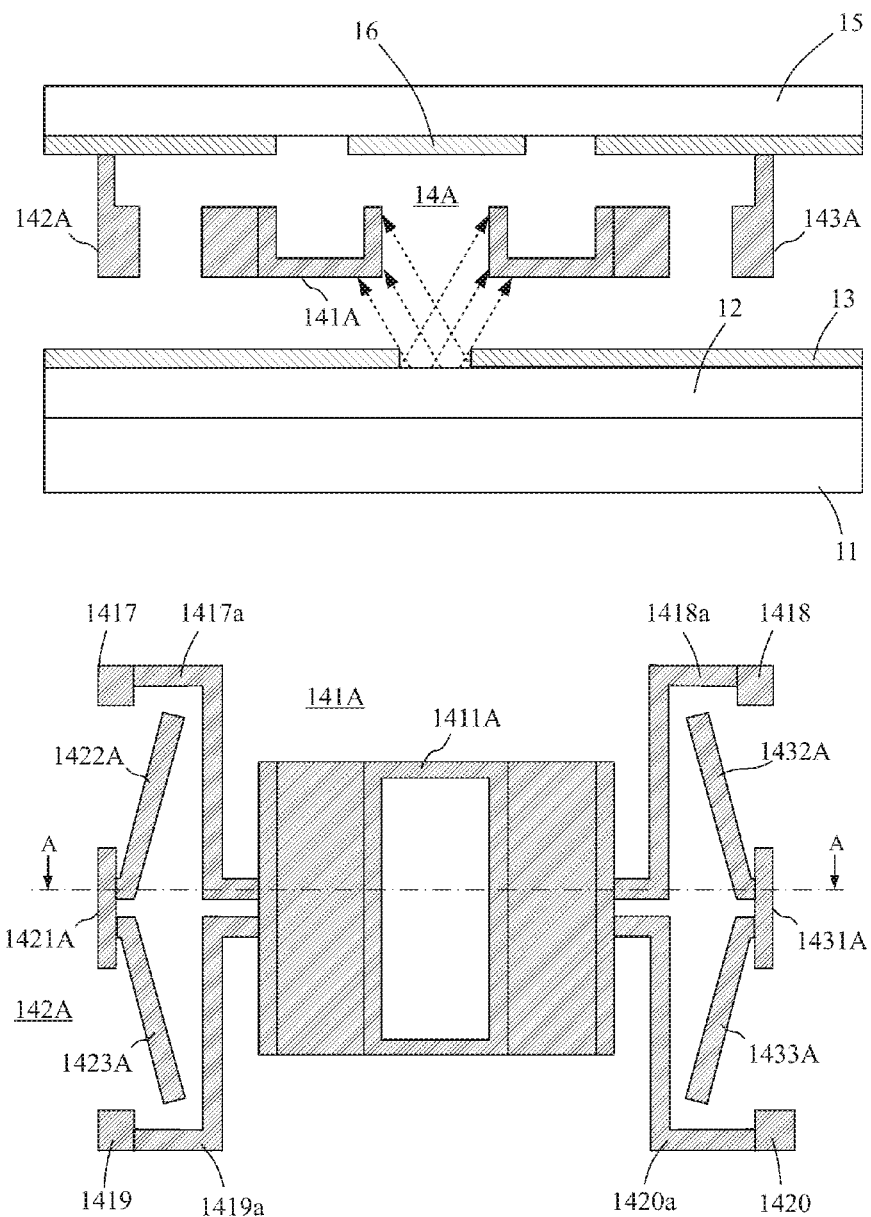
FIG. 11 is a schematic configuration diagram (the first state) of a backlight unit 11, a backlight side substrate 12, a backlight side light-shielding film 13, a MEMS shutter 14A, a display side substrate 15, and a display side light-shielding film 16 in a pixel unit (one pixel) of the display device 1000 according to Embodiment 3.

FIG. 11 shows a schematic configuration (the first state) of a backlight unit 11, a backlight side substrate 12, a backlight side light-shielding film 13, the MEMS shutter 14A, a display side substrate 15, and a display side light-shielding film 16 in a pixel unit (one pixel) of the display device according to the present embodiment. Specifically, the upper figure of FIG. 11 is a schematic cross-sectional view of one pixel in the display device according to the present embodiment, and the lower figure of FIG. 11 is a schematic configuration diagram of the MEMS shutter 14A in a plan view. The upper figure of FIG. 11 is a schematic cross-sectional view of the lower figure of FIG. 11 cut along the line A-A.

Figure 12:
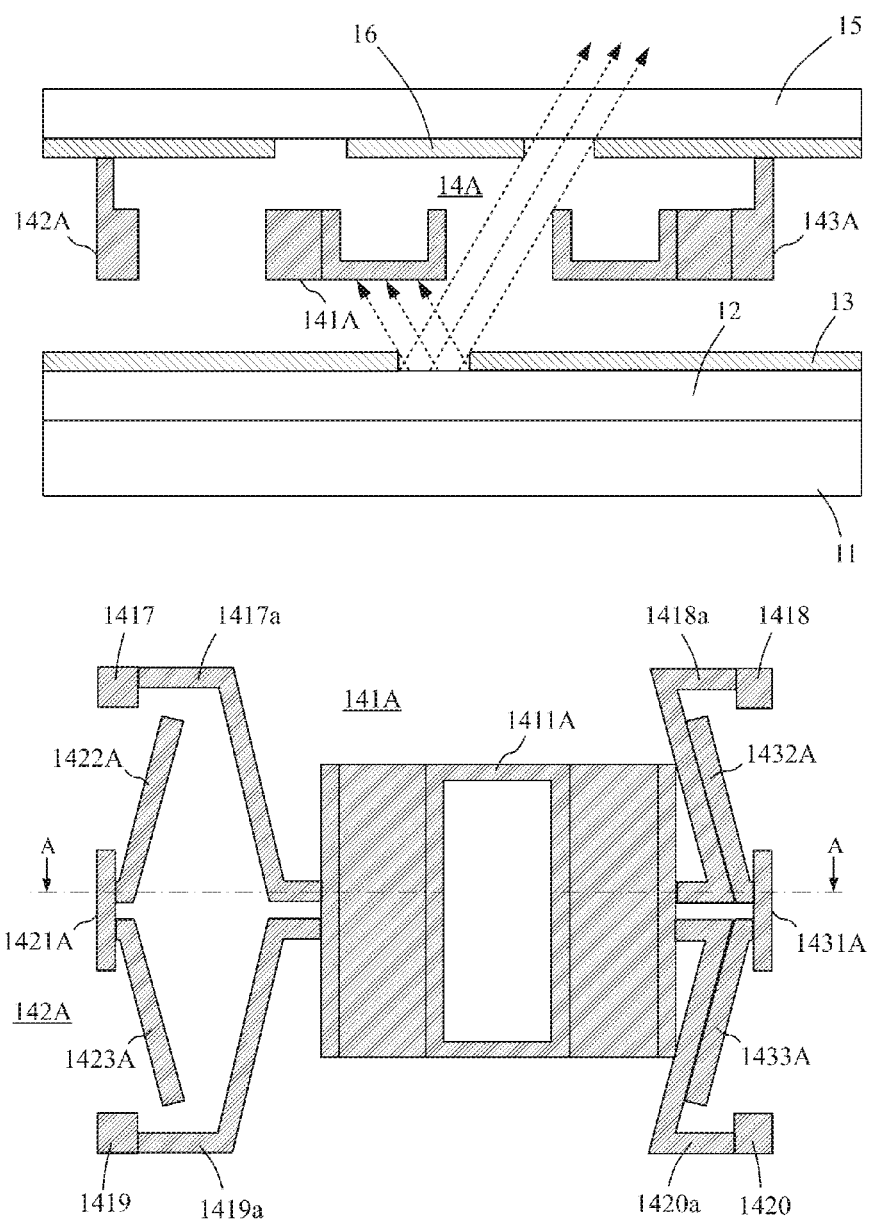
FIG. 12 is a schematic configuration diagram (the second state) of the backlight unit 11, the backlight side substrate 12, the backlight side light-shielding film 13, the MEMS shutter 14A, the display side substrate 15, and the display side light-shielding film 16 in a pixel unit (one pixel) of the display device 1000 according to Embodiment 3.

FIG. 12 shows a schematic configuration (the second state) of the backlight unit 11, the backlight side substrate 12, the backlight side light-shielding film 13, the MEMS shutter 14A, the display side substrate 15, and the display side light-shielding film 16 in a pixel unit (one pixel) of the display device according to the present embodiment. Specifically, the upper figure of FIG. 12 is a schematic cross-sectional view of the display device according to the present embodiment, and the lower figure of FIG. 12 is a schematic configuration diagram of the MEMS shutter 14A in a plan view. The upper figure of FIG. 12 is a schematic cross-sectional view of the lower figure of FIG. 12 cut along the line A-A.

Figure 13:
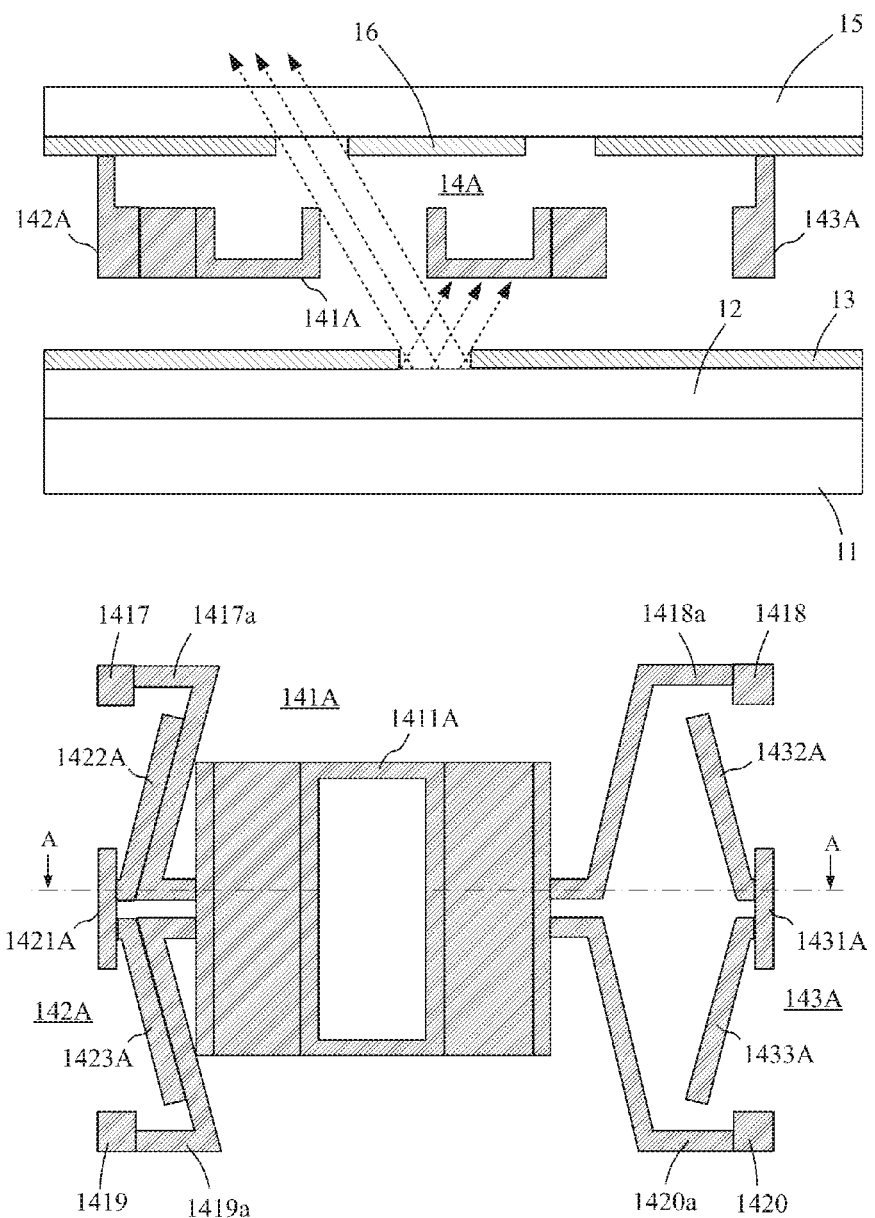
FIG. 13 is a schematic configuration diagram (the third state) of the backlight unit 11, the backlight side substrate 12, the backlight side light-shielding film 13, the MEMS shutter 14A, the display side substrate 15, and the display side light-shielding film 16 in a pixel unit (one pixel) of the display device 1000 according to Embodiment 3.

FIG. 13 shows a schematic configuration (the third state) of the backlight unit 11, the backlight side substrate 12, the backlight side light-shielding film 13, the MEMS shutter 14A, the display side substrate 15, and the display side light-shielding film 16 in a pixel unit (one pixel) of the display device according to the present embodiment. Specifically, the upper figure of FIG. 13 is a schematic cross-sectional view of the display device according to the present embodiment, and the lower figure of FIG. 13 is a schematic configuration diagram of the MEMS shutter 14A in a plan view. The upper figure of FIG. 13 is a schematic cross-sectional view of the lower figure of FIG. 13 cut along the line A-A.

As shown in FIGS. 11 to 13, with respect to the display device 1000 according to the present embodiment, in each of the pixels, one aperture is provided on the backlight side substrate 12, and two apertures are provided on the display side substrate 15.

As shown in FIGS. 11 to 13, the MEMS shutter 14A according to the present embodiment includes a shutter unit 141A, a first electrode unit 142A and a second electrode unit 143A. The first electrode unit 142A and the second electrode unit 143A of the MEMS shutter 14A are fixed to the display side light-shielding film 16. In addition, shutter unit electrodes 1417, 1418, 1419, and 1420 described later are also fixed to the display side light-shielding film 16.

As shown in FIG. 11, the shutter unit 141A includes a shutter body 1411A, the shutter unit electrodes 1417, 1418, 1419, and 1420, and shutter body elastic members 1417a, 1418a, 1419a, and 1420a.

As shown in FIG. 11, the shutter body 1411A has a rectangular aperture approximately in the center of the shutter body in a plan view. As shown in FIG. 11, the shutter body 1411A has walls rising approximately perpendicularly toward the display side substrate 15 from the bottom of the shutter body 1411A. One wall rises from the edge on the first electrode unit 142A side, another wall rises from the edge on the second electrode unit 143A side, and one wall rises from each of the long side edges of the aperture in a plan view.

As shown in FIG. 11, the shutter body 1411A is connected to the shutter unit electrodes 1417, 1418, 1419, and 1420 by the shutter body elastic members 1417a, 1418a, 1419a, and 1420a, respectively.

As shown in FIG. 11, the first electrode unit 142A includes a first electrode middle portion 1421A and first electrode extensions 1422A and 1423A.

As shown in FIG. 11, the second electrode unit 143A includes a second electrode middle portion 1431A and second electrode extensions 1432A and 1433A.

The display device according to the present embodiment includes the MEMS shutter 14A described above in each pixel.

In the state shown in FIG. 12 (the second state), at each pixel, the display device according to the present embodiment emits light from the backlight toward the first viewpoint P1 in the display device according to the present embodiment.

In the state shown in FIG. 13 (the third state), at each pixel, the display device emits light from the backlight toward the second viewpoint P2.

In other words, the display device according to the present embodiment displays a first video image (image toward the first viewpoint P1) when the shutter body 1411A is on the second electrode unit 143A side, and a second video image (image toward the second viewpoint P2) when the shutter body 1411A is on the first electrode unit 142A side. In other words, the relationship between the video images displayed in the present embodiment and the location of the shutter body 1411A is going to be opposite to that in Embodiment 1.

Thus, when displaying the video signal Din shown in FIG. 6 in the display device according to the present embodiment, the present embodiment needs to invert the location setting of the shutter body 1411A from that in Embodiment 1.

In other words, when displaying the video signal Din shown in FIG. 6 in the display device according to the present embodiment, the MEMS shutter may be controlled by the MEMS shutter control signal MEMS_ctl shown in the timing chart in FIG. 10 in a manner similar to Embodiment 2. Because the control is conducted in a manner similar to Embodiment 2, the description thereof is omitted.

As described above, the display device according to the present embodiment includes, in one pixel unit, one aperture on the backlight side substrate 12, two apertures on the display side substrate 15, and one aperture approximately in the middle of the shutter body 1411A of the MEMS shutter 14A. As shown in FIGS. 11 to 13, the display device according to the present embodiment can form two optical paths (the first optical path and the second optical path) for emitting light from the backlight with the one aperture provided on the backlight side substrate 12, the two apertures provided on the display side substrate 15, and the aperture provided approximately in the middle of the shutter body 1411A. In the display device according to the present embodiment, the display control unit 2 can control the location of the shutter 1411A of the MEMS shutter 14A for each pixel, and the path that light from the backlight passes through can be chosen, or light from the backlight can be blocked completely.

In other words, by controlling the MEMS shutter 14A in each of the pixels, the display device according to the present embodiment can control the passing and blocking of light that is emitted toward two different directions (the direction toward the first viewpoint P1 and the direction toward the second viewpoint P2). With this ability to control light, the display device according to the present embodiment can express, in each of the pixels, the respective pixel values of the video image, or in other words the gradation of the video image.

In other words, by controlling the MEMS shutter 14A in each of the pixels, the display device according to the present embodiment can emit desired light toward two different directions (the direction toward the first viewpoint P1 and the direction toward the second viewpoint P2). Because of this, the display device according to the present embodiment can display two video images (the first video image and the second video image) in two different directions (the direction toward the first viewpoint P1 and the direction toward the second viewpoint P2).

In addition, as described above, the display device according to the present embodiment can choose between two optical paths (in time division) using one pixel by controlling the MEMS shutter 14A. Thus, when displaying a stereoscopic image, the display device does not require two types of pixels, one for the image for the right eye and another for the image for the left eye, as in the case of the conventional technology, for example. In other words, the display device according to the present embodiment can display a video image using all of the pixels provided in the device. Thus, the display device according to the present embodiment does not suffer from reduced resolution like the conventional stereoscopic image display device, in which the resolution of the displayed video image is reduced by half with respect to the number of pixels provided in the device.

Furthermore, the display device according to the present embodiment does not require, as the conventional technology does, a parallax barrier, a lenticular lens, a polarizing plate, a color filter, liquid crystal elements used for pixels for the image for the right eye and for pixels for the image for the left eye, and the like because the display device can use the MEMS shutter 14A, as described above, to display two video images in two different directions (a stereoscopic image or dual view image, for example). The display device according to the present embodiment simply uses the MEMS shutter 14A to allow light from the backlight to pass or to block light from the backlight. Thus, as in the conventional technology, there is little loss of light (the lowering of transmittance) when the light passes through the liquid crystal, the polarizing plates, and the color filter. Thus, compared to the conventional technology, the display device according to the present embodiment can be made at a lower cost and the light transmittance of each pixel can be increased.

Furthermore, the display device according to the present embodiment affords greater flexibility in the choice of the location of the aperture on the backlight side substrate 12 and the apertures on the display side substrate 15 (the design freedom improves) because an aperture is provided in the shutter body 1411A of the MEMS shutter 14A. The display device can also reduce the space needed for the operation of the shutter body elastic members 1471a to 1420a, which support the shutter body 1411A of the MEMS shutter 14A. This configuration enables the shutter unit electrodes 1417 to 1420 to be arranged close to the first electrode unit 142A or the second electrode unit 143A. In other words, unutilized areas within one pixel can be reduced.

Embodiment 4

Next, Embodiment 4 will be described.

Below, parts particular to the present embodiment will be described, and the detailed description of the parts similar to the embodiment described above will be omitted.

Figure 14:
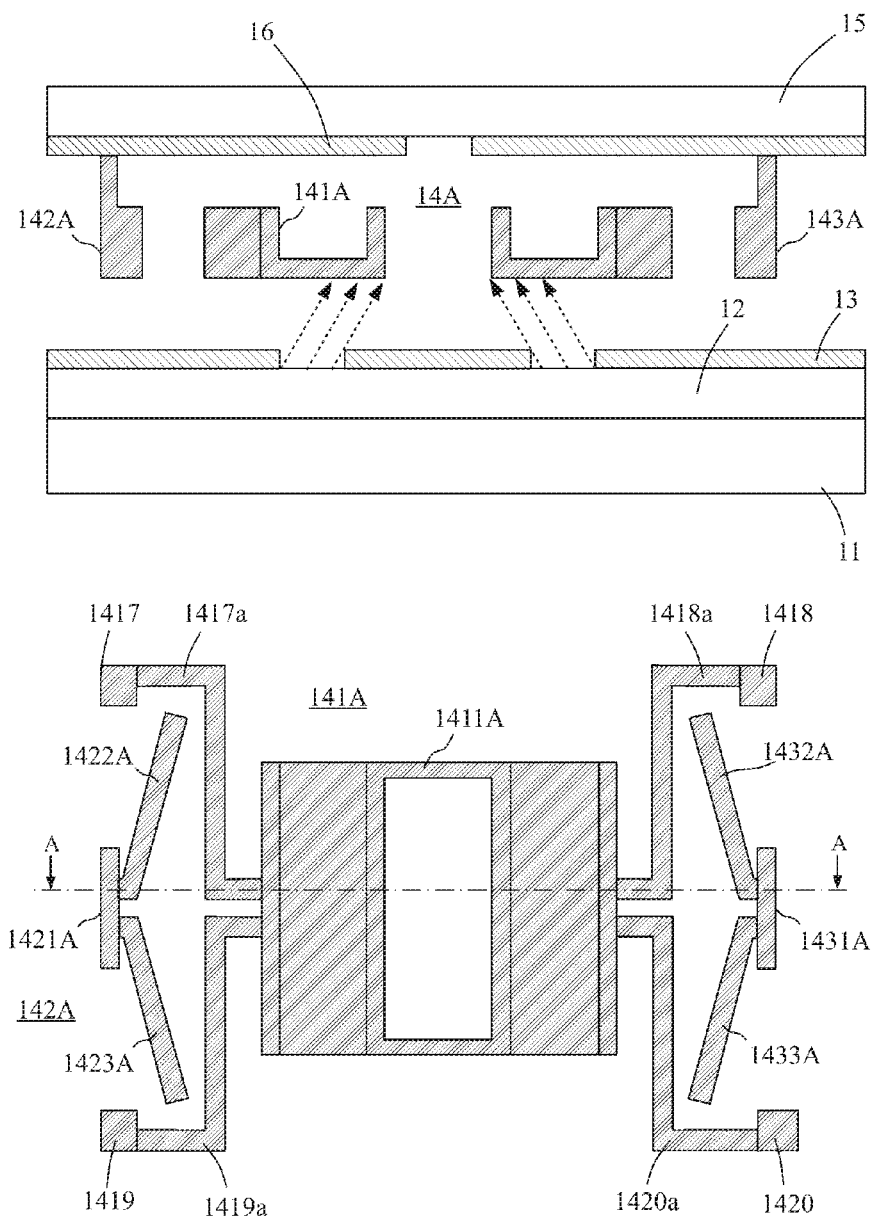
FIG. 14 is a schematic configuration diagram (the first state) of a backlight unit 11, a backlight side substrate 12, a backlight side light-shielding film 13, a MEMS shutter 14A, a display side substrate 15, and a display side light-shielding film 16 in a pixel unit (one pixel) of the display device 1000 according to Embodiment 4.
Figure 15:
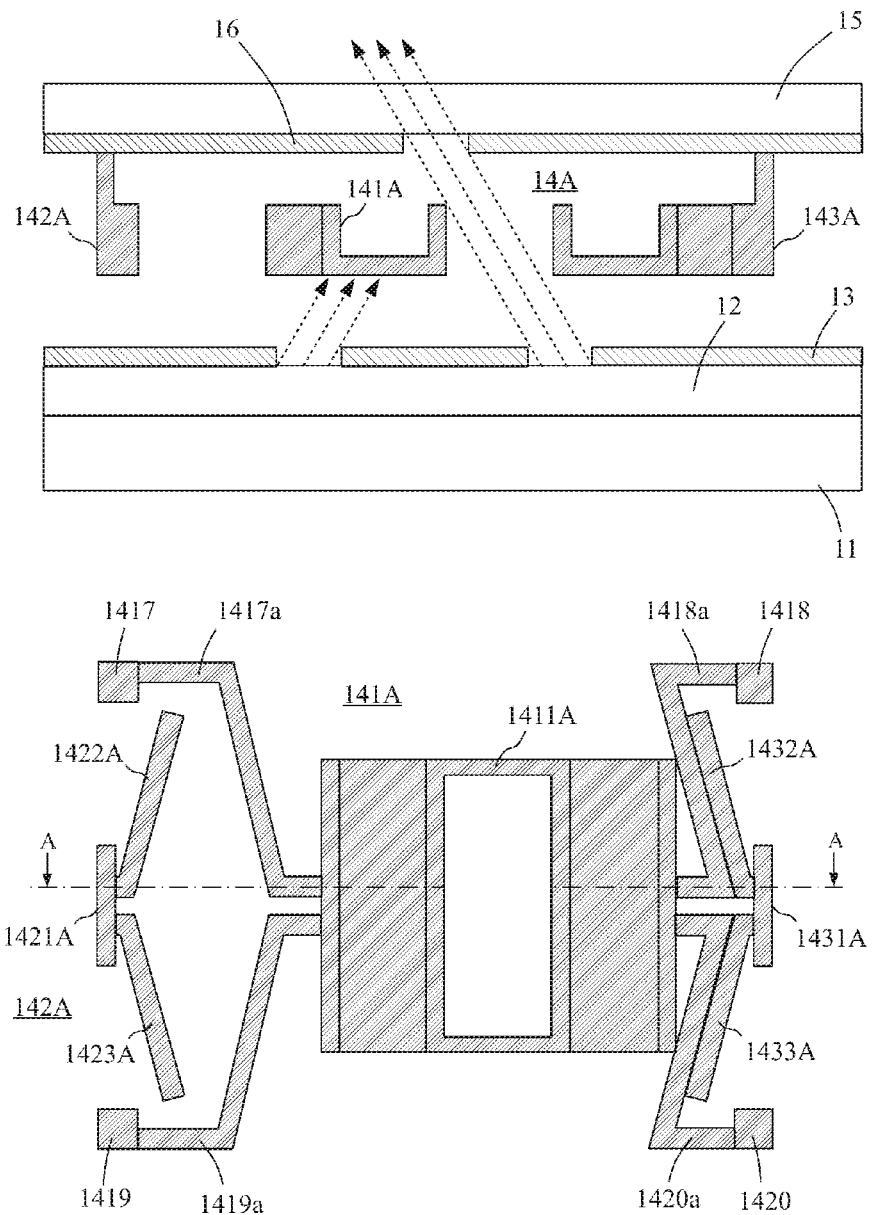
FIG. 15 is a schematic configuration diagram (the second state) of the backlight unit 11, the backlight side substrate 12, the backlight side light-shielding film 13, the MEMS shutter 14A, the display side substrate 15, and the display side light-shielding film 16 in a pixel unit (one pixel) of the display device 1000 according to Embodiment 4.
Figure 16:
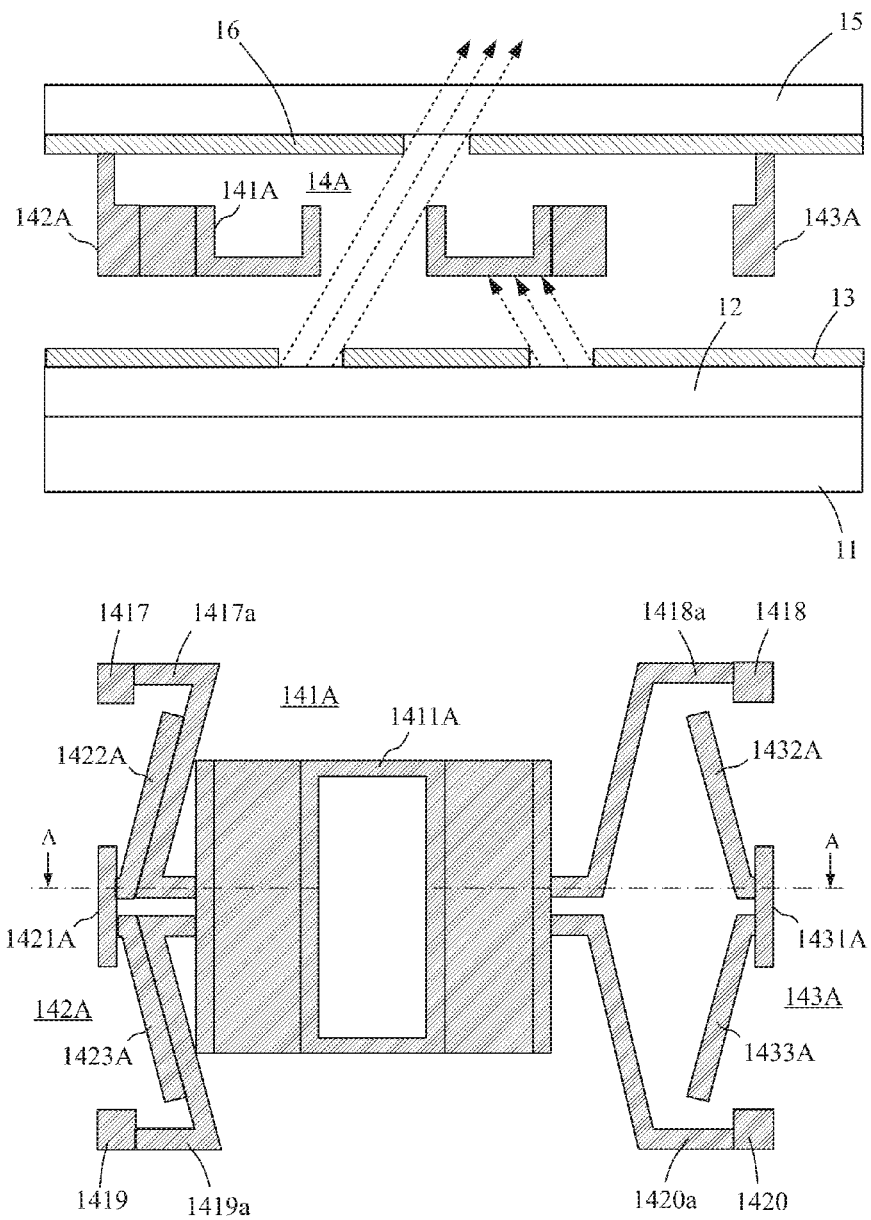
FIG. 16 is a schematic configuration diagram (the third state) of the backlight unit 11, the backlight side substrate 12, the backlight side light-shielding film 13, the MEMS shutter 14A, the display side substrate 15, and the display side light-shielding film 16 in a pixel unit (one pixel) of the display device 1000 according to Embodiment 4.

In the display device according to Embodiment 3, in each pixel, one aperture was provided on the backlight side substrate 12, and two apertures were provided on the display side substrate 15. However, as shown in FIGS. 14 to 16, in the display device according to Embodiment 4, in each pixel, two apertures are provided on a backlight side substrate 12, and one aperture is provided on a display side substrate 15. In this regard, the display device of the present embodiment differs from the display device according to Embodiment 3.

FIG. 14 shows a schematic configuration (the first state) of a backlight unit 11, a backlight side substrate 12, a backlight side light-shielding film 13, a MEMS shutter 14A, a display side substrate 15, and a display side light-shielding film 16 in a pixel unit (one pixel) of the display device according to the present embodiment. Specifically, the upper figure of FIG. 14 is a schematic cross-sectional view of one pixel in the display device according to the present embodiment, and the lower figure of FIG. 11 is a schematic configuration diagram of the MEMS shutter 14A in a plan view. The upper figure of FIG. 14 is a schematic cross-sectional view of the lower figure of FIG. 14 cut along the line A-A.

FIG. 15 shows a schematic configuration (the second state) of the backlight unit 11, the backlight side substrate 12, the backlight side light-shielding film 13, the MEMS shutter 14A, the display side substrate 15, and the display side light-shielding film 16 in a pixel unit (one pixel) of the display device according to the present embodiment. Specifically, the upper figure of FIG. 15 is a schematic cross-sectional view of the display device according to the present embodiment, and the lower figure of FIG. 15 is a schematic configuration diagram of the MEMS shutter 14A in a plan view. The upper figure of FIG. 15 is a schematic cross-sectional view of the lower figure of FIG. 15 cut along the line A-A.

FIG. 16 shows a schematic configuration (the third state) of the backlight unit 11, the backlight side substrate 12, the backlight side light-shielding film 13, the MEMS shutter 14A, the display side substrate 15, and the display side light-shielding film 16 in a pixel unit (one pixel) of the display device according to the present embodiment. Specifically, the upper figure of FIG. 16 is a schematic cross-sectional view of the display device according to the present embodiment, and the lower figure of FIG. 16 is a schematic configuration diagram of the MEMS shutter 14A in a plan view. The upper figure of FIG. 16 is a schematic cross-sectional view of the lower figure of FIG. 16 cut along the line A-A.

In the state shown in FIG. 15 (the second state), at each pixel, the display device according to the present embodiment emits light from the backlight toward the second viewpoint P2.

In the state shown in FIG. 16 (the third state), at each pixel, the display device emits light from the backlight toward the first viewpoint P1.

In other words, the display device according to the present embodiment displays a second video image (image toward the second viewpoint P2) when the shutter body 1411A is on the second electrode unit 143A side, a first video image (image toward the first viewpoint P1) when the shutter body 1411A is on the first electrode unit 142A side. In other words, the relationship between the video image displayed in the present embodiment and the location of the shutter body 1411A is going to be the same as that in Embodiment 1.

Thus, when displaying the video signal Din shown in FIG. 6 in the display device according to the present embodiment, the location setting of the shutter body 1411A should be the same as that in Embodiment 1.

In other words, when displaying the video signal Din shown in FIG. 6 in the display device according to the present embodiment, the MEMS shutter may be controlled by the MEMS shutter control signal MEMS_ctl shown in the timing chart in FIG. 6 in a manner similar to Embodiment 1. Because the control is conducted in a manner similar to Embodiment 1, the description thereof is omitted.

As described above, the display device according to the present embodiment includes, in one pixel unit, two apertures on the backlight side substrate 12, one aperture on the display side substrate 15, and one aperture approximately in the middle of the shutter body 1411A of the MEMS shutter 14A. As shown in FIGS. 14 to 16, the display device according to the present embodiment can form two optical paths (the first optical path and the second optical path) for emitting light from the backlight with the two apertures provided on the backlight side substrate 12, the one aperture provided on the display side substrate 15, and the aperture provided approximately in the middle of the shutter body 1411A. In the display device according to the present embodiment, the display control unit 2 can control the location of the shutter 1411A of the MEMS shutter 14A in each pixel and the path that light from the backlight passes through can be chosen, or light from the backlight can be blocked completely.

In other words, by controlling the MEMS shutter 14A in each of the pixels, the display device according to the present embodiment can control the passing and blocking of light that is emitted toward two different directions (the direction toward the first viewpoint P1 and the direction toward the second viewpoint P2). With this ability to control light, the display device according to the present embodiment can express, in each of the pixels, the respective pixel values of the video image, or in other words the gradation of the video image.

In other words, by controlling the MEMS shutter 14A in each of the pixels, the display device according to the present embodiment can emit desired light toward two different directions (the direction toward the first viewpoint P1 and the direction toward the second viewpoint P2). Because of this, the display device according to the present embodiment can display two video images (the first video image and the second video image) in two different directions (the direction toward the first viewpoint P1 and the direction toward the second viewpoint P2).

In addition, as described above, the display device according to the present embodiment can choose between two optical paths (in time division) using one pixel by controlling the MEMS shutter 14A. Thus, when displaying a stereoscopic image, the display device does not require two types of pixels, one for the image for the right eye and another for the image for the left eye, as in the case of the conventional technology, for example. In other words, the display device according to the present embodiment can display a video image using all of the pixels provided in the device. Thus, the display device according to the present embodiment does not suffer from reduced resolution like the conventional stereoscopic image display device, in which the resolution of the displayed video image is reduced by half with respect to the number of pixels provided in the device.

Furthermore, the display device according to the present embodiment does not require, as the conventional technology does, a parallax barrier, a lenticular lens, a polarizing plate, a color filter, liquid crystal elements used for pixels for the image for the right eye and for pixels for the image for the left eye, and the like because the display device can use the MEMS shutter 14A, as described above, to display two video images in two different directions (a stereoscopic image or dual view image, for example). The display device according to the present embodiment simply uses the MEMS shutter 14A to allow light from the backlight to pass or to block light from the backlight. Thus, as in the conventional technology, there is little loss of light (the lowering of transmittance) when the light passes through the liquid crystal, the polarizing plates, and the color filter. Thus, compared to the conventional technology, the display device according to the present embodiment can be made at a lower cost and the light transmittance of each pixel can be increased.

Furthermore, the display device according to the present embodiment affords greater flexibility in the choice of the location of the aperture on the backlight side substrate 12 and the apertures on the display side substrate 15 (the design freedom improves) because an aperture is provided in the shutter body 1411A of the MEMS shutter 14A. The display device can also reduce the space for the operation of the shutter body elastic members 1471a to 1420a, which support the shutter body 1411A of the MEMS shutter 14A. This configuration enables the shutter unit electrodes 1417 to 1420 to be arranged close to the first electrode unit 142A or the second electrode unit 143A. In other words, unutilized areas within one pixel can be reduced.

Other Embodiments

The embodiments above described a case in which the two video images (the first video image and the second video image) are displayed on the display device by emitting light toward the first viewpoint P1 and the second viewpoint P2 as shown in FIG. 5, for example. These embodiments indicated the shape and the location of the apertures on the backlight substrate 12 and the display side substrate 15 that are used for displaying the images. However, these are merely examples, and the present invention is not limited to these examples.

When displaying two video images toward the first and the second viewpoints, the apertures on the backlight side substrate 12 and the shape of the apertures on the display side substrate 15 may be set as to secure optical paths toward the first and the second viewpoints, respectively.

The display device can display a stereoscopic video image (stereoscopic image) by assigning the first viewpoints as the left eye viewpoint and the second viewpoint as the right eye viewpoint.

The embodiments described above described a case in which the display device was controlled as to apply an attractive force between the shutter body and the first electrode unit when moving the shutter body of the MEMS shutter 14 or 14A toward the first electrode unit side of the MEMS shutter 14 or 14A, for example. This was done by setting the second electrode unit to the GND potential and charging the shutter body and the first electrode unit with charges of different polarity. However, the present invention is not limited to this case. When moving the shutter body of the MEMS shutter 14 or 14A toward the first electrode unit side of the MEMS shutter 14 or 14A, for example, (1) the shutter body and the first electrode unit may be made to be attracted toward each other by charging the shutter body and the first electrode unit with opposite charges, and (2) the shutter body and the second electrode unit may be made to repel each other by charging the shutter body and the second electrode unit with same charges, for example.

Figure 17:
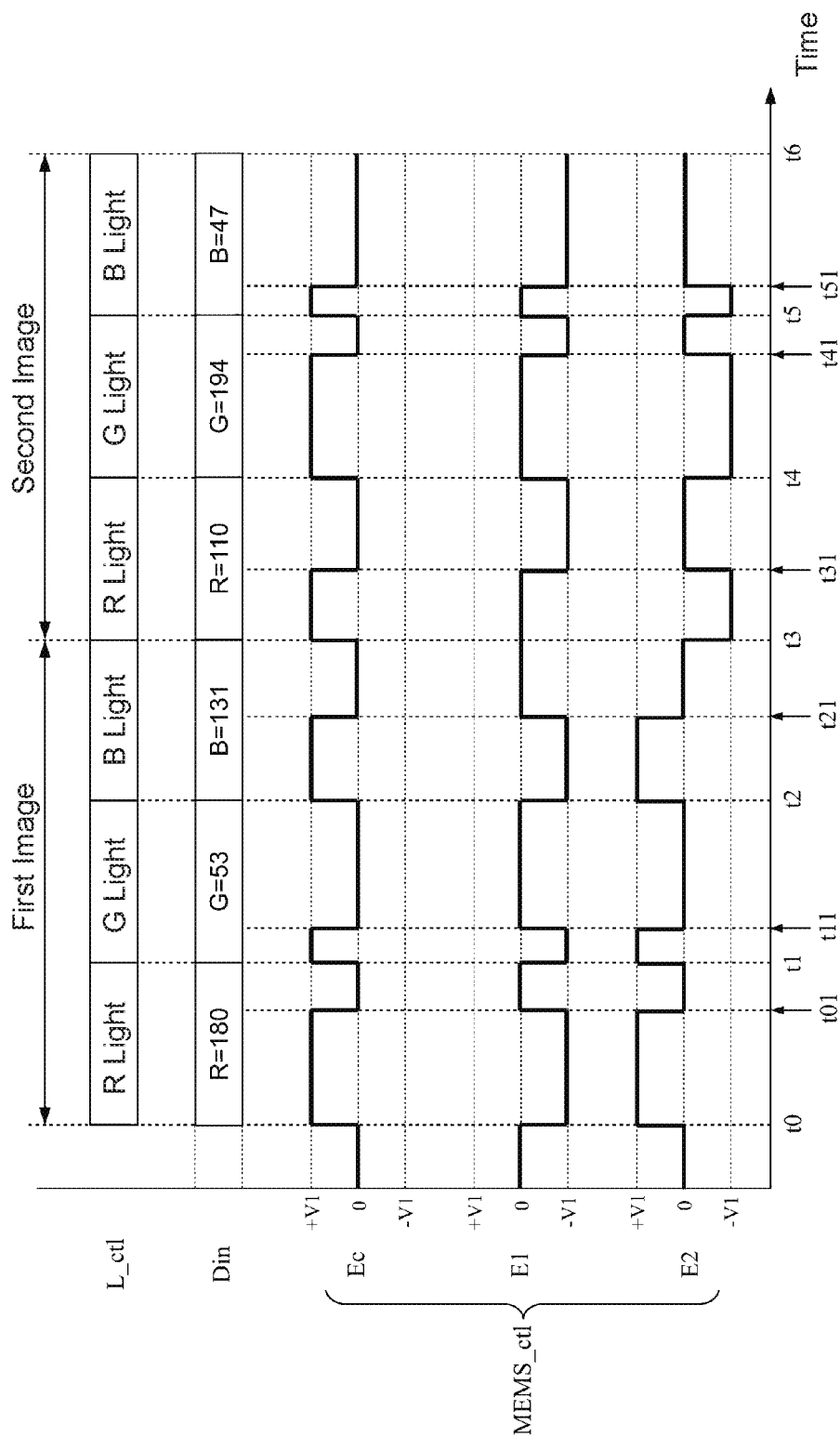
FIG. 17 is a timing chart (one example) showing the relationship between a video signal Din that forms a first video image and a second video image, a backlight control signal L_ctl, and a MEMS shutter control signal MEMS_ctl.

Instead of using the MEMS shutter control signal MEMS_ctl shown in the timing chart in FIG. 6, the display device may use the MEMS shutter control signal MEMS_ctl shown in the timing chart in FIG. 17 to control the MEMS shutter 14 or 14A. By using the MEMS shutter control signal MEMS_ctl shown in FIG. 17, the display device can control the shutter body such that a repulsive force operates between the shutter body and the electrode unit located opposite to the direction of the movement of the shutter body.

In FIGS. 6, 10, and 17, a case in which the signal values (voltage) of the control signals Ec, E1, and E2 assumed either the values $+V1$, $0$, or $-V1$ was described. However, the values are not limited to these, and the signal values (voltage) of the control signals Ec, E1, and E2 may assume $+V1$, $0$, or $-V2$, for example. In other words, the absolute value of the potential (voltage) used to charge the electrode units positively may differ from the absolute value of the potential (voltage) used to charge the electrode units negatively.

A part or all of the display device of the respective embodiments described above may be implemented as an integrated circuit (LSI, system LSI, or the like, for example).

A program may implement a part or all of the processes from each function block of the respective embodiments described above. Moreover, in a computer, a central processing unit (CPU) may carry out a part or all of the processes from each function block of the respective embodiments described above. In addition, the programs for carrying out each process may be stored in a storage device such as a hard disk or ROM and executed by reading ROM or RAM.

The respective processes of the embodiments described above may also be implemented using hardware or implemented using software (including cases in which the processes are implemented by an operating system (OS), middleware, or prescribed library). Moreover, the processes may be implemented using mixed processing that combines software and hardware processing.

The order of execution for the processing methods in the embodiments described above are not necessarily limited by the description of the embodiments described above. The order of execution can be changed within a scope that does not depart from the gist of the present invention.

The computer program that executes the methods described above in the computer and a computer readable storage medium that stores the program are included in the scope of the present invention. Here, examples of a computer readable storage medium include a floppy disk, hard disk, CD-ROM, MO, DVD, DVD-ROM, DVD-RAM, high-density DVD, next-generation DVD, and semiconductor memory, for example.

The computer program described above is not limited to being stored in the storage medium described above and may be transmitted through a network represented by an electric communication line, wireless or wired communication line, the internet, or the like.

In the embodiments described above, only main members of the components required for the embodiments described above are shown in a simplified manner. Accordingly, other arbitrary components not explicitly shown in the embodiments described above may be included. The dimensions of the members in the respective embodiments and drawings do not faithfully represent the dimensions of actual members, the dimensional ratios of the respective members, or the like.

The specific configurations of the present invention are not limited by the embodiments described above, and various changes and modifications are possible within a range that does not depart from the gist of the present invention.

<Addendum>

The present invention can also be expressed as follows.

The display device according to configuration 1 is a display device that displays at least two video images by emitting light in at least two directions from each pixel unit and includes a light source, a first substrate, a second substrate, a conductive movable part, and a driving control unit.

The first substrate is a substrate for limiting light from the light source.

The second substrate is a substrate for limiting light from the light source and arranged facing the first substrate.

The conductive movable part is a conductive movable part provided between the first substrate and the second substrate for each of the pixel unit and includes a light-shielding portion that can move within a prescribed range and driving electrodes for moving the light-shielding portion to a prescribed position.

The driving control unit performs control for arranging the light-shielding portion of the conductive movable part to the prescribed position.

On the first substrate, the first group of apertures having one aperture or a plurality of apertures that transmit light is provided for each pixel unit.

On the second substrate, the second group of apertures having one aperture or a plurality of apertures that transmit light is provided for each pixel unit.

When the second group of apertures includes one aperture for each pixel unit, the second group of apertures and the first group of apertures that includes a plurality of apertures for each pixel unit are arranged such that the apertures form the first optical path and the second optical path, which are two different paths from the first group of apertures.

When the second group of apertures includes a plurality of apertures for each pixel unit, the second group of apertures and the first group of apertures that includes one aperture for each pixel unit are arranged such that the apertures form the first optical path and the second optical path, which are two different paths from the first group of apertures.

When displaying the first video image, the driving control unit controls the light-shielding portion in each pixel unit so that the light-shielding portion is positioned either to ensure the first optical path or to block light from the first group of apertures. When displaying the second video image, the driving control unit controls the light-shielding portion in each pixel unit so that the light-shielding portion is positioned either to secure the second optical path or to block light from the first group of apertures.

In this display device, in one pixel unit, the first group of apertures and the second group of apertures form the first optical path and the second optical path. By controlling the position of the light-shielding portion of the conductive movable part, the display device can select the path through which light (light from the backlight) from the light source passes or block light (light from the backlight) from the light source completely.

In other words, by controlling the conductive movable part in each of the pixels, the display device can control the passing and blocking of light that is emitted toward two different directions (the direction toward the first viewpoint P1 and the direction toward the second viewpoint P2, for example). With this ability to control light, the display device can express, in each of the pixels, the respective pixel values of the video image, or in other words the gradation of the video image.

In other words, by controlling the conductive movable part in each of the pixels, the display device can emit desired light toward two different directions (the direction toward the first viewpoint P1 and the direction toward the second viewpoint P2, for example). Because of this, the display device can display two video images (the first video image and the second video image) toward two different directions (the direction toward the first viewpoint P1 and the direction toward the second viewpoint P2, for example).

In addition, as described above, the display device can choose between two optical paths (in time division) using one pixel by controlling the conductive movable part. Thus, when displaying a stereoscopic image, the display device does not require two types of pixels, one for the image for the right eye and another for the image for the left eye, as in the case of the conventional technology, for example. In other words, the display device can display a video image using all of the pixels provided in the device. Thus, the display device does not suffer from reduced resolution like the conventional stereoscopic image display device, in which the resolution of the displayed video image is reduced by half with respect to the number of pixels provided in the device (the reduction in the resolution of the displayed video image can be prevented).

"Video image" is a concept that includes images.

The first substrate may be implemented by forming a member (a film, for example) that shields light on the surface of a transparent member. Then, the first group of apertures, which is one aperture or a plurality of apertures that transmits light, may be formed in each of the pixel units of the first substrate by providing apertures in the member that shields light (a film, for example).

The second substrate may be implemented by forming a member that shields light (a film, for example) on the surface of a transparent member. Then, the second group of apertures, which is one aperture or a plurality of apertures that transmits light, may be formed in each of the pixel units of the second substrate by providing apertures in the member that shields light (film, for example).

The display device according to configuration 2 is configuration 1, in which the first substrate includes the first group of apertures including two apertures for each of the pixel units, and the second substrate includes the second group of apertures including one aperture for each of the pixel units.

In this configuration, the two apertures in the first substrate and the one aperture in the second substrate can form two different optical paths for each of the pixels.

The display device according to configuration 3 is configuration 1, in which the first substrate includes the first group of apertures including one aperture for each of the pixel units, and the second substrate includes the second group of aperture including two apertures for each of the pixel units.

In this configuration, the one aperture in the first substrate and the two apertures in the second substrate can form two different optical paths for each of the pixels.

The display device according to configuration 4 is configuration 1, in which the light-shielding portion of the conductive movable part includes an aperture therein in a plan view.

In such a display device, design freedom in forming two different optical paths increases because an aperture is included within the light-shielding portion of the conductive movable part. In other words, design freedom regarding the location, the shape, or the like of the apertures provided in the first substrate and the aperture provided in the second substrate when forming two different optical paths for each of the pixels can increase because the display device can use the aperture provided in the light-shielding portion of the conductive movable part to transmit the light.

The display device according to configuration 5 is any one of configurations 2 to 4, in which the light-shielding portion of the conductive movable part includes an aperture approximately in the middle of the light-shielding portion in a plan view.

In other words, design freedom regarding the location, the shape, or the like of the apertures provided in the first substrate and the aperture provided in the second substrate when forming two different optical paths for each of the pixels can increase because the display device can use the aperture provided approximately in the middle of the light-shielding portion of the conductive movable part to transmit the light.

The display device according to configuration 6 is configuration 1, in which the first substrate includes N (where N is a natural number greater than or equal to 2) apertures for each of the pixel units, and the second substrate includes N+1 apertures for each of the pixel units.

In this configuration, a plurality of optical paths can be formed for each of the pixel units.

The display device according to configuration 7 is configuration 6, in which the light-shielding portion of the conductive movable part includes N apertures therein.

In this configuration, a plurality of optical path can be formed for each of the pixel units. Furthermore, design freedom regarding the location or the like of the apertures for forming the optical paths increases because the light-shielding portion of the conductive movable part includes N apertures.

The display device according to configuration 8 is configuration 6, in which the light-shielding portion of the conductive movable part includes one aperture approximately in the middle of the light-shielding portion in a plan view.

In this configuration, a plurality of optical path can be formed for each of the pixel units. Furthermore, design freedom regarding the location or the like of the apertures for forming the optical paths increases because the light-shielding portion of the conductive movable part includes one aperture.

The display device according to configuration 9 is configuration 1, in which the first substrate includes M+1 (where M is a natural number greater than or equal to 2) apertures for each of the pixel units, and the second substrate includes M apertures for each of the pixel units.

In this configuration, a plurality of optical paths can be formed for each of the pixel units.

In the display device according to configuration 10, the light-shielding portion of the conductive movable part includes M apertures therein.

In this configuration, a plurality of optical paths can be formed for each of the pixel units. Furthermore, design freedom regarding the location or the like of the apertures for forming the optical paths increases because the light-shielding portion of the conductive movable part includes M apertures.

In the display device according to configuration 11, the light-shielding portion of the conductive movable part includes one aperture approximately in the middle of the light-shielding portion in a plan view.

In this configuration, a plurality of optical paths can be formed for each of the pixel units. Furthermore, design freedom regarding the location or the like of the apertures for forming the optical paths increases because the light-shielding portion of the conductive movable part includes one aperture.

The display device according to configuration 12 is any one of configurations 1 to 11, in which the driving control unit, when displaying the first video image, designates for each of the pixel units the time when the light-shielding portion is positioned to ensure the first optical path and the time when the light-shielding portion is positioned to block light from the first group of apertures based on the pixel value of the first video image and controls the position of the light-shielding portion based on the designation.

The driving control unit, when displaying the second video image, designates for each of the pixel units the time when the light-shielding portion is positioned to ensure the second optical path and the time when the light-shielding portion is positioned to block light from the first group of apertures based on the pixel value of the second video image and controls the position of the light-shielding portion based on the designation.

This display device makes possible both the choice and control of optical paths and the gradation control because controlling the position of the light-shielding portion allows the display device to adjust the time when the display device transmits or blocks light for displaying a video image.

The display device according to configuration 13 is any one of configurations 1 to 12, in which the light-shielding portion of the conductive movable part is connected to electrodes by elastic members and positioned to block light from the first group of apertures when neither an attractive force or a repulsive force is applied between the driving electrodes and the light-shielding portion.

In this configuration, the display device can block light for displaying a video image (can perform black display) by not charging the driving electrodes.

INDUSTRIAL APPLICABILITY

The display device according to the present invention can display a plurality of images and prevent the reduction of the resolution of the displayed image by emitting light from one pixel unit toward a plurality of different directions. Thus, the display device is useful in the industrial field of display devices and can be implemented in this field.

Description of Reference Characters

| | |
|---|---|
| 1000 | display device |
| 1 | display unit |
| 11 | backlight unit |
| 12 | backlight side substrate |
| 13 | backlight side light-shielding film |
| 14, 14A | MEMS shutter |
| 141, 141A | shutter unit |
| 1411, 1411A | shutter body |
| 1412, 1413, 1414, 1415, 1417, 1418, 1419, 1420 | shutter unit electrode |
| 1412a, 1413a, 1414a, 1415a, 1417a, 1418a, 1419a, 1420a | shutter body elastic member |
| 142, 142A | first electrode unit |
| 143, 143A | second electrode unit |

What is claimed is:

1. A display device that displays at least first and second images by emitting light in at least two directions, respectively, from each of a plurality of pixels, comprising:

a light source;

a first substrate over the light source, said first substrate restricting light from the light source; and a second substrate over the first substrate, said second substrate restricting light that originated from the light source and that has passed through the first substrate, wherein each of the pixels has an electrically conductive light-shielding member movably disposed between the first and second substrates, and driving electrodes that cause the light-shielding member to move to prescribed positions, wherein the display device further comprises a driving control unit that drives said driving electrodes to move the light-shielding member to the respective prescribed positions for each of the pixels, wherein, at each of the pixels, the first substrate has one or more of first apertures that transmit light, wherein, at each of the pixels, the second substrate has one or more of second apertures that transmit light, wherein, at each of the pixels, said one or more of the first apertures and said one or more of the second apertures are configured to define at least a first optical path and a second optical path that are different from each other for the light from the light source, wherein, in order to display the first image, at each of the pixels, the driving control unit causes the light-shielding member to move between a first position where the first optical path is not blocked and the second optical path is blocked by the light-shielding member and a second position where the first and second optical paths are both blocked by the light-shielding member, and wherein, in order to display the second image, at each of the pixels, the driving control unit causes the light-shielding member to move between a third position where the first optical path is blocked and the second optical path is not blocked by the light-shielding member and a fourth position where the first and second optical paths are both blocked by the light-shielding member.

2. The display device according to claim 1, wherein the first substrate has, at each of the pixels, only two first apertures, and the second substrate has, at each of the pixels, only one second aperture.

3. The display device according to claim 1, wherein the first substrate has, at each of the pixels, only one first aperture, and the second substrate has, for each of the pixels, only two second apertures.

4. The display device according to claim 1, wherein the light-shielding member includes an aperture therein in a plan view.

5. The display device according to claim 2, wherein the light-shielding member includes an aperture approximately in a middle of the light-shielding member in a plan view.

6. The display device according to claim 1, wherein, at each of the pixels, the first substrate includes N first apertures and, at each of the pixels, the second substrate includes N+1 second apertures, where N is a natural number greater than or equal to 2.

7. The display device according to claim 6, wherein the light-shielding member includes N apertures therein.

8. The display device according to claim 6, wherein the light-shielding member includes one aperture approximately in a middle of the light-shielding member in a plan view.

9. The display device according to claim 1, wherein, at each of the pixels, the first substrate includes M+1 first apertures, and, for each of the pixels, the second substrate includes M second apertures, where M is a natural number greater than or equal to 2.

10. The display device according to claim 9, wherein the light-shielding member includes M apertures therein.

11. The display device according to claim 9, wherein the light-shielding member includes one aperture approximately in a middle of the light-shielding portion member in a plan view.

12. The display device according to claim 1,
wherein, in order to display the first image, the driving control unit determines, for each of the pixels, an allocation of a time during which the light-shielding member is in the first position and a time during which the light-shielding member is in the second position in accordance with a pixel value of the first image for the pixel, and controls the position of the light-shielding member in accordance with said allocation, and
wherein, in order to display the second image, the driving control unit determines, for each of the pixels, an allocation of a time during which the light-shielding member is in the third position and a time during which the light-shielding member is in the fourth position in accordance with a pixel value of the second image for the pixel, and controls the position of the light-shielding member in accordance with said allocation.

13. The display device according to claim 1,
wherein each of the pixels further includes:
electrodes, and
elastic members that respectively connect the electrodes to the light-shielding member,
wherein when neither an attractive force nor a repulsive force is applied between the respective driving electrodes and the light-shielding member, the light-shielding member is in a position to block both the first and second optical paths.

14. The display device according to claim 1, wherein the second and fourth positions are the same.

* * * * *